United States Patent
Sikdar et al.

(10) Patent No.: US 7,451,268 B2
(45) Date of Patent: * Nov. 11, 2008

(54) ARBITER FOR ARRAY MACHINE CONTEXT DATA MEMORY

(75) Inventors: Somsubhra Sikdar, San Jose, CA (US); Kevin Jerome Rowett, Cupertino, CA (US); Hoai V. Tran, Gilroy, CA (US); Jonathan Sweedler, Los Gatos, CA (US); Komal Rathi, Sunnyvale, CA (US); Mike Davoudi, San Jose, CA (US)

(73) Assignee: Gigafin Networks, Inc., Cupertino, CA (US)

(*) Notice: Subject to any disclaimer, the term of this patent is extended or adjusted under 35 U.S.C. 154(b) by 229 days.

This patent is subject to a terminal disclaimer.

(21) Appl. No.: 11/181,598

(22) Filed: Jul. 13, 2005

(65) Prior Publication Data

US 2006/0168324 A1 Jul. 27, 2006

Related U.S. Application Data

(60) Provisional application No. 60/591,663, filed on Jul. 27, 2004.

(51) Int. Cl.
*G06F 12/02* (2006.01)
(52) U.S. Cl. ............................ 711/108; 710/52; 710/56
(58) Field of Classification Search ........................ None
See application file for complete search history.

(56) References Cited

U.S. PATENT DOCUMENTS

| | | | |
|---|---|---|---|
| 5,193,192 A | 3/1993 | Seberger | |
| 5,487,147 A | 1/1996 | Brisson | |
| 5,781,729 A | 7/1998 | Baker et al. | |
| 5,793,954 A | 8/1998 | Baker et al. | |
| 5,805,808 A | 9/1998 | Hasani et al. | |
| 5,916,305 A | 6/1999 | Sikdar et al. | |
| 5,991,539 A | 11/1999 | Williams | |
| 6,000,041 A | 12/1999 | Baker et al. | |
| 6,034,963 A | 3/2000 | Minami et al. | |
| 6,085,029 A | 7/2000 | Kolawa et al. | |
| 6,122,757 A | 9/2000 | Kelley | |
| 6,145,073 A | 11/2000 | Cismas | |
| 6,266,700 B1 | 7/2001 | Baker et al. | |
| 6,330,659 B1 | 12/2001 | Poff et al. | |
| 6,356,950 B1 | 3/2002 | Tillman et al. | |
| 6,460,010 B1 * | 10/2002 | Hanes et al. | ................ 702/179 |
| 6,493,761 B1 | 12/2002 | Baker et al. | |
| 6,985,964 B1 | 1/2006 | Petersen et al. | |
| 7,206,922 B1 * | 4/2007 | Steiss | ......................... 712/216 |

(Continued)

OTHER PUBLICATIONS

Can Programming be Liberated from the von Neumann Style? A Functional Style and Its Algebra of Programs (John Bakus, *Communications of the ACM*, Aug. 1978, vol. 21, No. 8, pp. 613-641).

(Continued)

*Primary Examiner*—Than Nguyen
(74) *Attorney, Agent, or Firm*—Stolowitz Ford Cowger LLP

(57) ABSTRACT

A device comprises a plurality of interface circuits configured for communicating between a semantic processing unit and a memory and a selection circuit for selecting an interface circuit allocated to a semantic processing unit for processing a data operation request in the memory.

18 Claims, 17 Drawing Sheets

U.S. PATENT DOCUMENTS

| | | |
|---|---|---|
| 2001/0010066 A1* | 7/2001 | Chin et al. .................. 711/108 |
| 2001/0056504 A1 | 12/2001 | Kuznetsov |
| 2002/0078115 A1 | 6/2002 | Poff et al. |
| 2003/0014588 A1* | 1/2003 | Hu et al. .................... 711/118 |
| 2003/0060927 A1 | 3/2003 | Gerbi et al. |
| 2003/0165160 A1 | 9/2003 | Minami et al. |
| 2004/0062267 A1 | 4/2004 | Minami et al. |
| 2004/0081202 A1 | 4/2004 | Minami et al. |
| 2005/0165966 A1 | 7/2005 | Gai et al. |
| 2006/0026378 A1* | 2/2006 | Sikdar et al. ................ 711/170 |

OTHER PUBLICATIONS

*Compliers Principles, Techniques and Tools* (Alfred V. Aho, Ravi Sethi, Jeffrey D. Ullman, Mar. 1998, pp. 186-192, 216-257).

* cited by examiner

| 63 | 43 | 19 | 15 | 13 | 11 | 7 | 4 | 3 | 2 | 1 | 0 |
|---|---|---|---|---|---|---|---|---|---|---|---|
| Address | SRAM Data | Table ID | Error | Target | Stat_Code | Opcode | Multi_hit | Stat_Ready | Cmd_in_Progress | Cmd Ready | |

TIME A

| LUIF ID | Operation Pending | Priority | Action |
|---|---|---|---|
| 1 | NO | 0 | |
| 2 | NO | 0 | |
| 3 | YES | 0 | |
| 4 | NO | 0 | Select 3 |
| 5 | NO | 0 | |
| 6 | NO | 0 | |
| 7 | YES | 0 | |
| 8 | NO | 0 | |

TIME B

| LUIF ID | Operation Pending | Priority | Action |
|---|---|---|---|
| 1 | NO | 0 | |
| 2 | NO | 0 | |
| 3 | YES | 1 | |
| 4 | NO | 0 | Select 7 |
| 5 | NO | 0 | |
| 6 | NO | 0 | |
| 7 | YES | 0 | |
| 8 | NO | 0 | |

TIME C

| LUIF ID | Operation Pending | Priority | Action |
|---|---|---|---|
| 1 | YES | 0 | |
| 2 | NO | 0 | |
| 3 | YES | 1 | |
| 4 | NO | 0 | Select 1 |
| 5 | NO | 0 | |
| 6 | NO | 0 | |
| 7 | NO | 1 | |
| 8 | NO | 0 | |

TIME D

| LUIF ID | Operation Pending | Priority | Action |
|---|---|---|---|
| 1 | NO | 1 | |
| 2 | NO | 0 | |
| 3 | YES | 1 | |
| 4 | NO | 0 | Select 3 |
| 5 | NO | 0 | |
| 6 | NO | 0 | |
| 7 | NO | 1 | |
| 8 | NO | 0 | |

FIG. 21

ARBITER FOR ARRAY MACHINE CONTEXT DATA MEMORY

REFERENCE TO RELATED APPLICATIONS

This application claims priority from U.S. Provisional Application No. 60/591,663 filed Jul. 27, 2004 and is incorporated herein by reference. Copending U.S. patent application Ser. No. 10/351,030, entitled "Reconfigurable Semantic Processor," filed by Somsubhra Sikdar on Jan. 24, 2003, is incorporated herein by reference.

BACKGROUND OF THE INVENTION

Network processing devices need to read and write to memory for different types of data. These different data types have different characteristics. For example, control type data may require relatively random address accesses in memory with relatively small data transfers for each memory access.

Other types of data, such as streaming data, may be located within a same contiguous address region in memory and may require relatively large data transfers each time memory is accessed. In one example, streaming data refers to a stream of packet data that may all be related to a same Internet session; for example, a stream of video or audio data carried in packets over a same Internet connection.

Current memory architectures do not optimize memory access for these different types of data within the same computing system. For example, many memory architectures use a cache to improve memory performance by caching a subset of data from a main Dynamic Random Access Memory (DRAM). The cache may use a Static Random Access Memory (SRAM) or other buffers that provide faster memory accesses for the subset of data in the cache. The cache is continuously and automatically updated with data from the DRAM that has most recently been accessed. The oldest accessed address locations in the cache are automatically replaced with the newest accessed address locations.

These conventional cache architectures do not efficiently handle different types of memory transfers, such as the streaming data mentioned above. For example, one memory transfer of streaming packet data may completely replace all the entries in the cache. When the streaming data transfer is completed, the cache then has to replace the contents of the cache again other non-streaming data, for example, with data used for conducting control operations. This continuous replacement of entries in the cache may actually slow down memory access time.

Another problem exists because the cache is not configured to efficiently access both streaming data and smaller sized control data. For example, the size of the cache lines may be too small to efficiently cache the streaming data. On the other hand, large cache lines may be too large to effectively cache the smaller randomly accessed control data.

Embodiments of the invention address these and other problems associated with the prior art.

DESCRIPTION OF THE DRAWINGS

The invention may be best understood by reading the disclosure with reference to the drawings.

FIGS. 8-21 show the memory subsystem 240 in more detail.

DETAILED DESCRIPTION OF THE EMBODIMENTS

Figure 1:
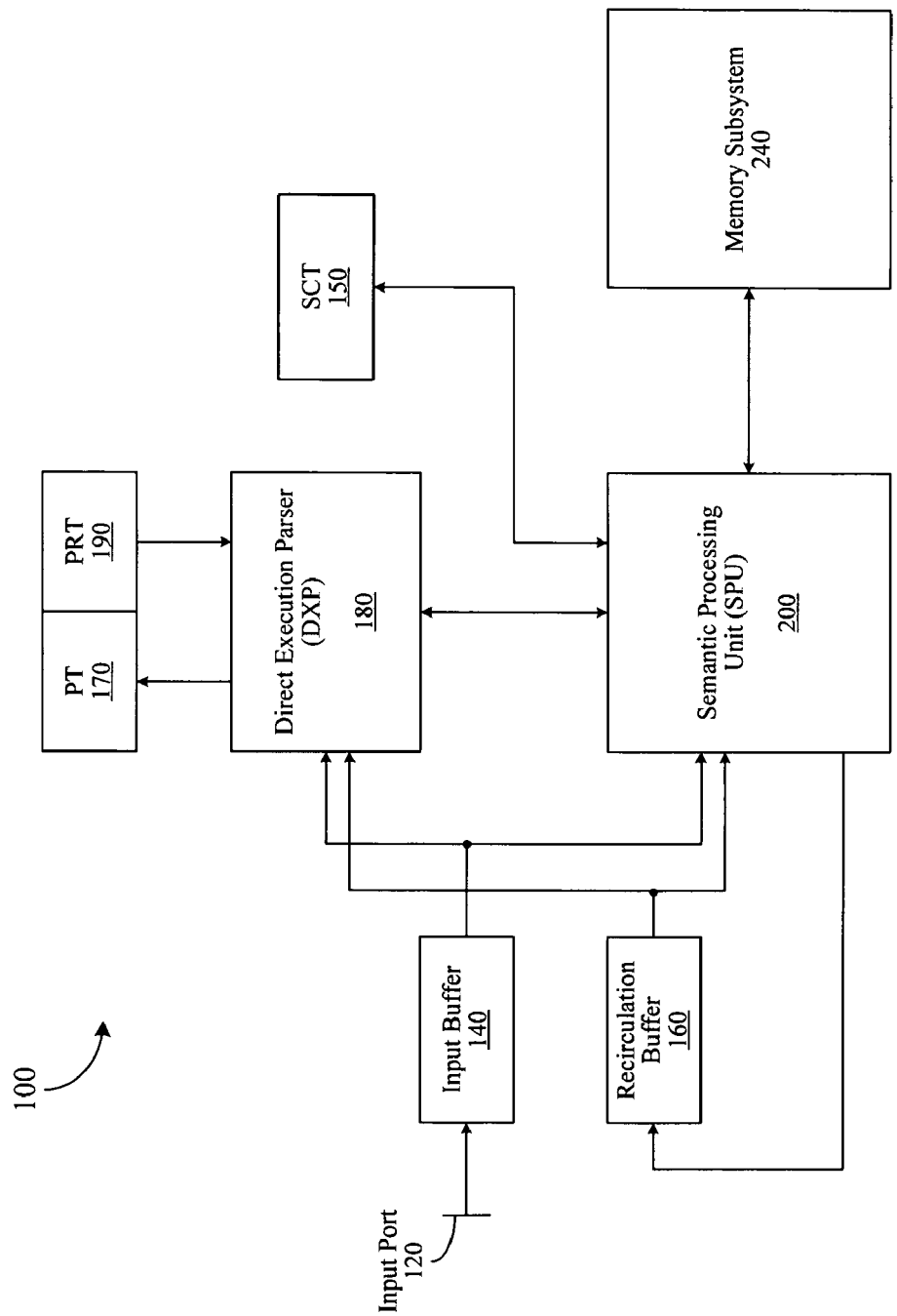
FIG. 1 illustrates, in block form, a semantic processor useful with embodiments of the invention.

FIG. 1 shows a block diagram of a semantic processor 100 according to an embodiment of the invention. The semantic processor 100 contains an input buffer 140 for buffering a packet data stream (e.g., the input stream) received through the input port 120, a direct execution parser (DXP) 180 that controls the processing of packet data received at the input buffer 140, a recirculation buffer 160, a semantic processing unit 200 for processing segments of the packets or for performing other operations, and a memory subsystem 240 for storing and/or augmenting segments of the packets. The input buffer 140 and recirculation buffer 160 are preferably first-in-first-out (FIFO) buffers.

The DXP 180 controls the processing of packets or frames within the input buffer 140 (e.g., the input stream) and the recirculation buffer 160 (e.g., the recirculation stream). Since the DXP 180 parses the input stream from input buffer 140 and the recirculation stream from the recirculation buffer 160 in a similar fashion, only the parsing of the input stream will be described below.

The DXP 180 maintains an internal parser stack (not shown) of terminal and non-terminal symbols, based on parsing of the current frame up to the current symbol. For instance, each symbol on the internal parser stack is capable of indicating to the DXP 180 a parsing state for the current input frame or packet. When the symbol (or symbols) at the top of the parser stack is a terminal symbol, DXP 180 compares data at the head of the input stream to the terminal symbol and expects a match in order to continue. When the symbol at the top of the parser stack is a non-terminal symbol, DXP 180 uses the non-terminal symbol and current input data to expand the grammar production on the stack. As parsing continues, DXP 180 instructs SPU 200 to process segments of the input stream or perform other operations. The DXP 180 may parse the data in the input stream prior to receiving all of the data to be processed by the semantic processor 100. For instance, when the data is packetized, the semantic processor 100 may begin to parse through the headers of the packet before the entire packet is received at input port 120.

Semantic processor 100 uses at least three tables. Code segments for SPU 200 are stored in semantic code table (SCT) 150. Complex grammatical production rules are stored in a production rule table (PRT) 190. Production rule codes for retrieving those production rules are stored in a parser table (PT) 170. The production rule codes in parser table 170 allow DXP 180 to detect whether, for a given production rule, a code segment from SCT 150 should be loaded and executed by SPU 200.

Some embodiments of the invention contain many more elements than those shown in FIG. 1, but these essential elements appear in every system or software embodiment.

Thus, a description of the packet flow within the semantic processor 100 shown in FIG. 1 will be given before more complex embodiments are addressed.

Figure 2:
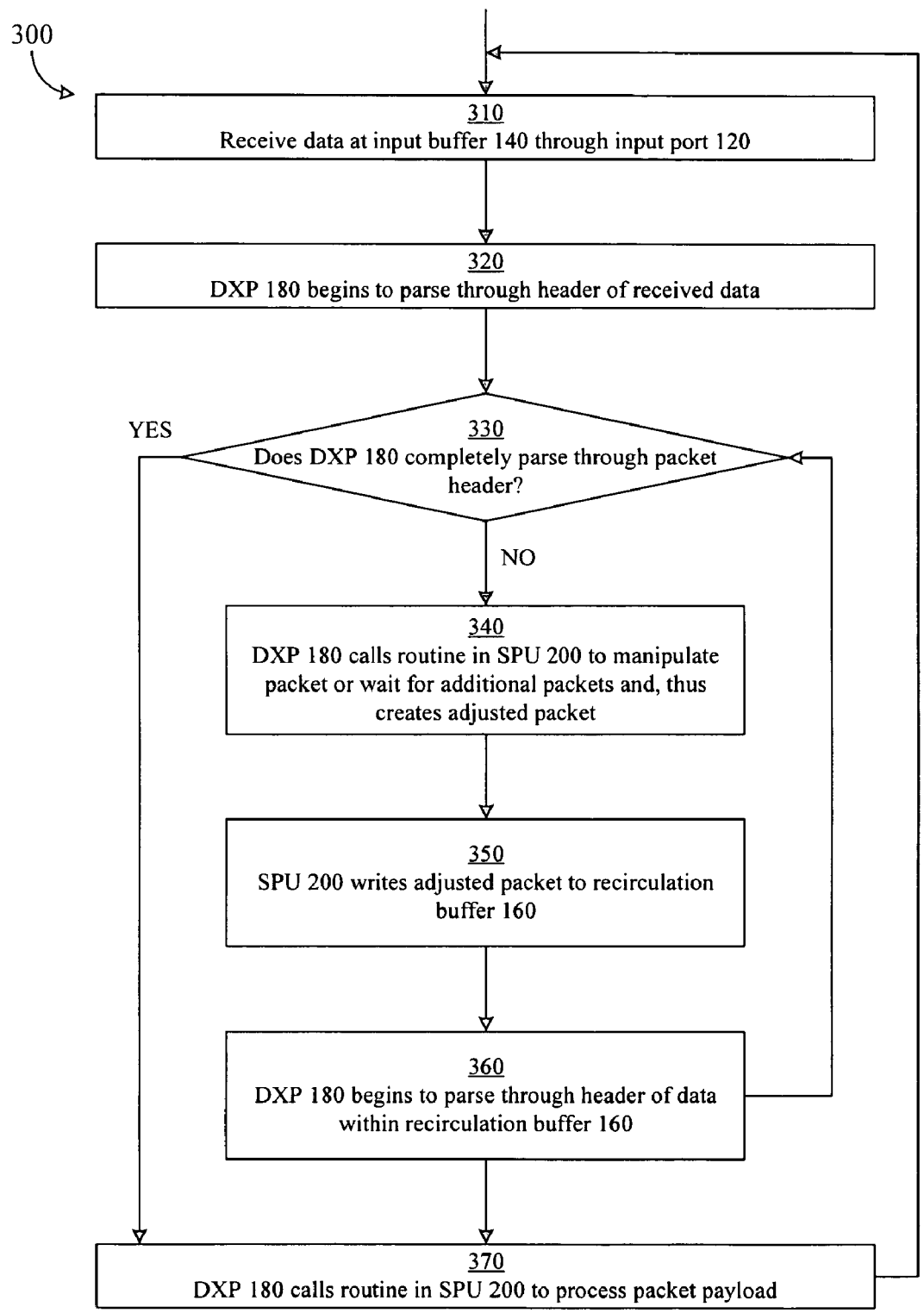
FIG. 2 contains a flow chart for the processing of received packets in the semantic processor with the recirculation buffer in FIG. 1.

FIG. 2 contains a flow chart 300 for the processing of received packets through the semantic processor 100 of FIG. 1. The flowchart 300 is used for illustrating a method of the invention.

According to a block 310, a packet is received at the input buffer 140 through the input port 120. According to a next block 320, the DXP 180 begins to parse through the header of the packet within the input buffer 140. According to a decision block 330, it is determined whether the DXP 180 was able to completely parse through header. In the case where the packet needs no additional manipulation or additional packets to enable the processing of the packet payload, the DXP 180 will completely parse through the header. In the case where the packet needs additional manipulation or additional packets to enable the processing of the packet payload, the DXP 180 will cease to parse the header.

If the DXP 180 was able to completely parse through the header, then according to a next block 370, the DXP 180 calls a routine within the SPU 200 to process the packet payload. The semantic processor 100 then waits for a next packet to be received at the input buffer 140 through the input port 120.

If the DXP 180 had to cease parsing the header, then according to a next block 340, the DXP 180 calls a routine within the SPU 200 to manipulate the packet or wait for additional packets. Upon completion of the manipulation or the arrival of additional packets, the SPU 200 creates an adjusted packet.

According to a next block 350, the SPU 200 writes the adjusted packet (or a portion thereof) to the recirculation buffer 160. This can be accomplished by either enabling the recirculation buffer 160 with direct memory access to the memory subsystem 240 or by having the SPU 200 read the adjusted packet from the memory subsystem 240 and then write the adjusted packet to the recirculation buffer 160. Optionally, to save processing time within the SPU 200, instead of the entire adjusted packet, a specialized header can be written to the recirculation buffer 160. This specialized header directs the SPU 200 to process the adjusted packet without having to transfer the entire packet out of memory subsystem 240.

According to a next block 360, the DXP 180 begins to parse through the header of the data within the recirculation buffer 160. Execution is then returned to block 330, where it is determined whether the DXP 180 was able to completely parse through the header. If the DXP 180 was able to completely parse through the header, then according to a next block 370, the DXP 180 calls a routine within the SPU 200 to process the packet payload and the semantic processor 100 waits for a next packet to be received at the input buffer 140 through the input port 120.

If the DXP 180 had to cease parsing the header, execution returns to block 340 where the DXP 180 calls a routine within the SPU 200 to manipulate the packet or wait for additional packets, thus creating an adjusted packet. The SPU 200 then writes the adjusted packet to the recirculation buffer 160, and the DXP 180 begins to parse through the header of the packet within the recirculation buffer 160.

Figure 3:
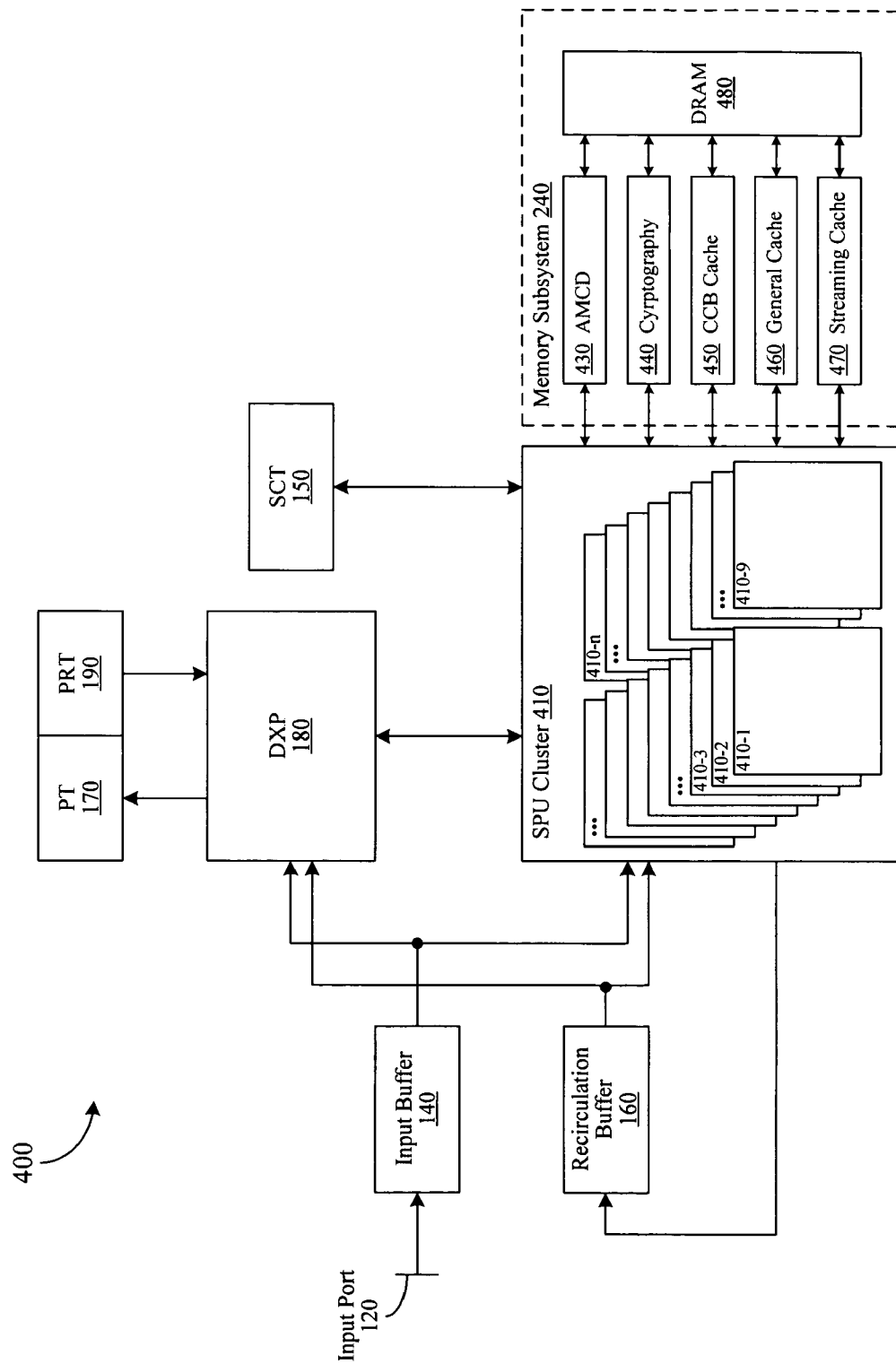
FIG. 3 illustrates a more detailed semantic processor implementation useful with embodiments of the invention.

FIG. 3 shows another semantic processor embodiment 400. Semantic processor 400 includes memory subsystem 240, which comprises an array machine-context data memory (AMCD) 430 for accessing data in dynamic random access memory (DRAM) 480 through a hashing function or content-addressable memory (CAM) lookup, a cryptography block 440 for encryption or decryption, and/or authentication of data, a context control block (CCB) cache 450 for caching context control blocks to and from DRAM 480, a general cache 460 for caching data used in basic operations, and a streaming cache 470 for caching data streams as they are being written to and read from DRAM 480. The context control block cache 450 is preferably a software-controlled cache, i.e., the SPU 410 determines when a cache line is used and freed.

The SPU 410 is coupled with AMCD 430, cryptography block 440, CCB cache 450, general cache 460, and streaming cache 470. When signaled by the DXP 180 to process a segment of data in memory subsystem 240 or received at input buffer 120 (FIG. 1), the SPU 410 loads microinstructions from semantic code table (SCT) 150. The loaded microinstructions are then executed in the SPU 410 and the segment of the packet is processed accordingly.

Figure 4:
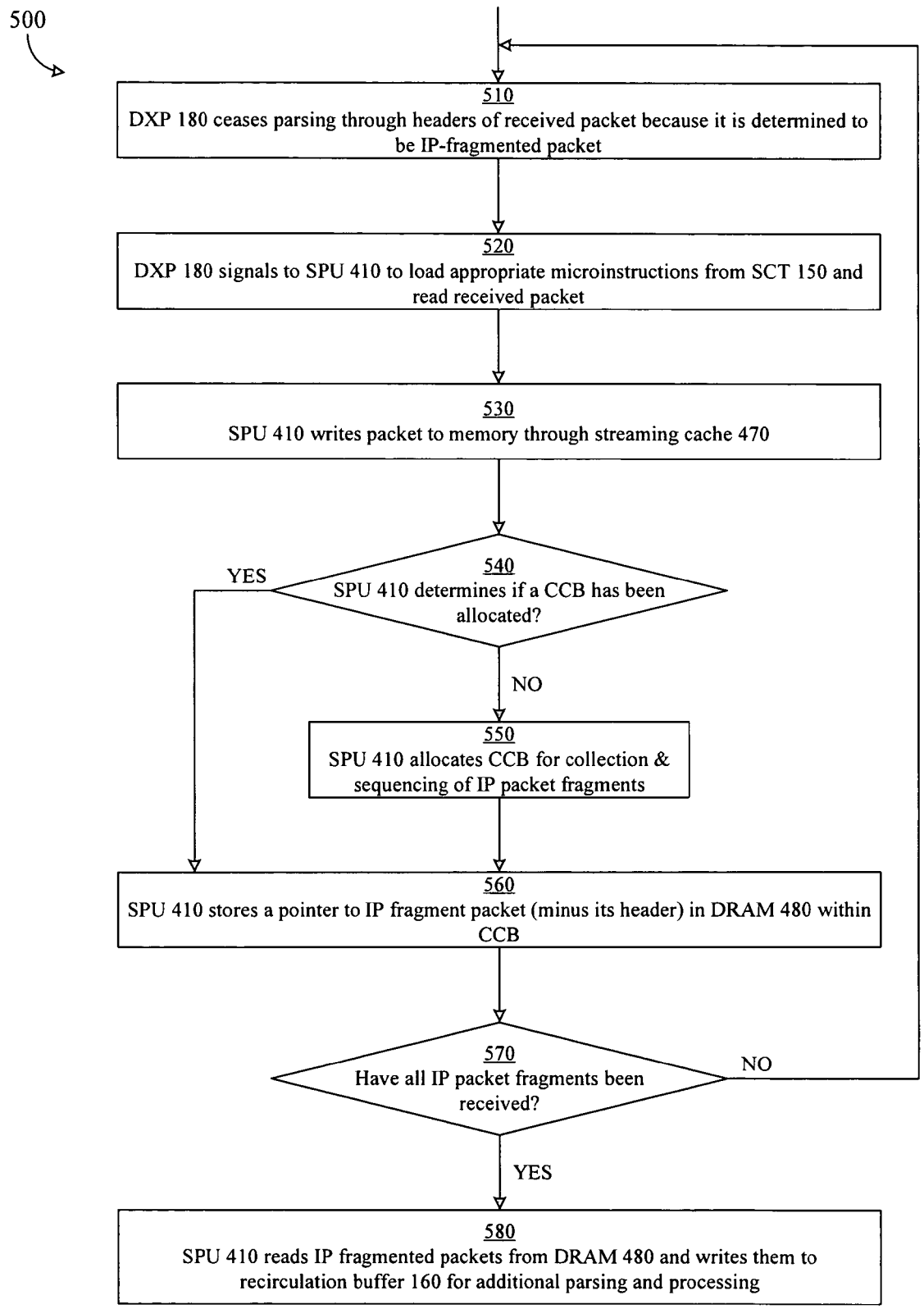
FIG. 4 contains a flow chart of received IP-fragmented packets in the semantic processor in FIG. 3.

FIG. 4 contains a flow chart 500 for the processing of received Internet Protocol (IP)-fragmented packets through the semantic processor 400 of FIG. 3. The flowchart 500 is used for illustrating one method according to an embodiment of the invention.

Once a packet is received at the input buffer 140 through the input port 120 and the DXP 180 begins to parse through the headers of the packet within the input buffer 140, according to a block 510, the DXP 180 ceases parsing through the headers of the received packet because the packet is determined to be an IP-fragmented packet. Preferably, the DXP 180 completely parses through the IP header, but ceases to parse through any headers belonging to subsequent layers, such as TCP, UDP, iSCSI, etc.

According to a next block 520, the DXP 180 signals to the SPU 410 to load the appropriate microinstructions from the SCT 150 and read the received packet from the input buffer 140. According to a next block 530, the SPU 410 writes the received packet to DRAM 480 through the streaming cache 470. Although blocks 520 and 530 are shown as two separate steps, optionally, they can be performed as one step—with the SPU 410 reading and writing the packet concurrently. This concurrent operation of reading and writing by the SPU 410 is known as SPU pipelining, where the SPU 410 acts as a conduit or pipeline for streaming data to be transferred between two blocks within the semantic processor 400.

According to a next decision block 540, the SPU 410 determines if a Context Control Block (CCB) has been allocated for the collection and sequencing of the correct IP packet fragments. Preferably, the CCB for collecting and sequencing the fragments corresponding to an IP-fragmented packet is stored in DRAM 480. The CCB contains pointers to the IP fragments in DRAM 480, a bit mask for the IP-fragmented packets that have not arrived, and a timer value to force the semantic processor 400 to cease waiting for additional IP-fragmented packets after an allotted period of time and to release the data stored in the CCB within DRAM 480.

The SPU 410 preferably determines if a CCB has been allocated by accessing the AMCD's 430 content-addressable memory (CAM) lookup function using the IP source address of the received IP-fragmented packet combined with the identification and protocol from the header of the received IP packet fragment as a key. Optionally, the IP fragment keys are stored in a separate CCB table within DRAM 480 and are accessed with the CAM by using the IP source address of the received IP-fragmented packet combined with the identification and protocol from the header of the received IP packet fragment. This optional addressing of the IP fragment keys avoids key overlap and sizing problems.

If the SPU 410 determines that a CCB has not been allocated for the collection and sequencing of fragments for a particular IP-fragmented packet, execution then proceeds to a block 550 where the SPU 410 allocates a CCB. The SPU 410 preferably enters a key corresponding to the allocated CCB, the key comprising the IP source address of the received IP fragment and the identification and protocol from the header of the received IP-fragmented packet, into an IP fragment CCB table within the AMCD 430, and starts the timer located in the CCB. When the first fragment for given fragmented packet is received, the IP header is also saved to the CCB for later recirculation. For further fragments, the IP header need not be saved.

Once a CCB has been allocated for the collection and sequencing of IP-fragmented packet, the SPU 410 stores a pointer to the IP-fragmented packet (minus its IP header) in DRAM 480 within the CCB, according to a next block 560. The pointers for the fragments can be arranged in the CCB as, e.g., a linked list. Preferably, the SPU 410 also updates the bit mask in the newly allocated CCB by marking the portion of the mask corresponding to the received fragment as received.

According to a next decision block 570, the SPU 410 determines if all of the IP fragments from the packet have been received. Preferably, this determination is accomplished by using the bit mask in the CCB. A person of ordinary skill in the art can appreciate that there are multiple techniques readily available to implement the bit mask, or an equivalent tracking mechanism, for use with the invention.

If all of the fragments have not been received for the IP-fragmented packet, then the semantic processor 400 defers further processing on that fragmented packet until another fragment is received.

If all of the IP fragments have been received, according to a next block 580, the SPU 410 resets the timer, reads the IP fragments from DRAM 480 in the correct order, and writes them to the recirculation buffer 160 for additional parsing and processing. Preferably, the SPU 410 writes only a specialized header and the first part of the reassembled IP packet (with the fragmentation bit unset) to the recirculation buffer 160. The specialized header enables the DXP 180 to direct the processing of the reassembled IP-fragmented packet stored in DRAM 480 without having to transfer all of the IP-fragmented packets to the recirculation buffer 160. The specialized header can consist of a designated non-terminal symbol that loads parser grammar for IP and a pointer to the CCB. The parser can then parse the IP header normally and proceed to parse higher-layer (e.g., TCP) headers.

In an embodiment of the invention, DXP 180 decides to parse the data received at either the recirculation buffer 160 or the input buffer 140 through round robin arbitration. A high level description of round robin arbitration will now be discussed with reference to a first and a second buffer for receiving packet data streams. After completing the parsing of a packet within the first buffer, DXP 180 looks to the second buffer to determine if data is available to be parsed. If so, the data from the second buffer is parsed. If not, then DXP 180 looks back to the first buffer to determine if data is available to be parsed. DXP 180 continues this round robin arbitration until data is available to be parsed in either the first buffer or second buffer.

Figure 5:
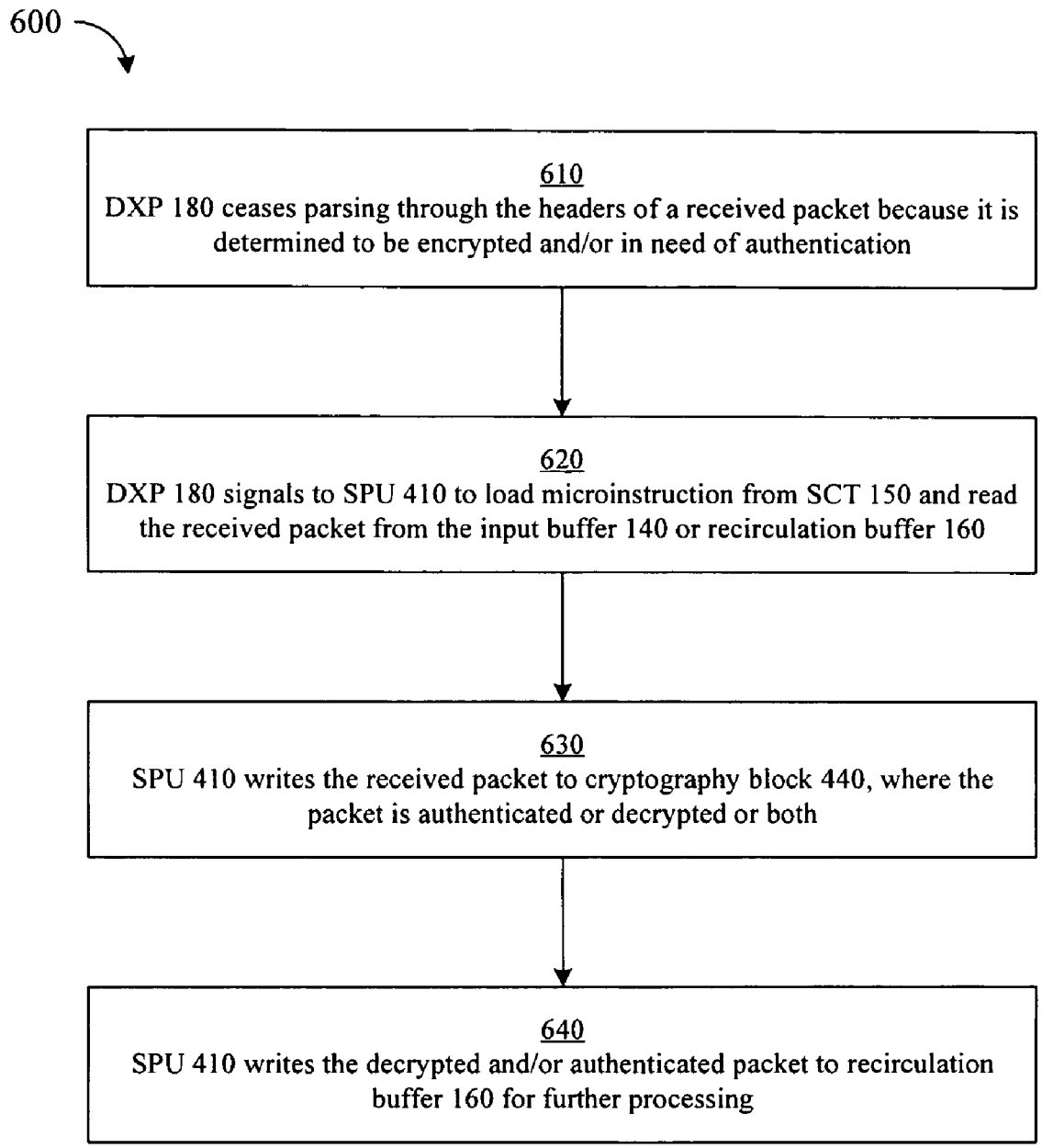
FIG. 5 contains a flow chart of received encrypted and/or unauthenticated packets in the semantic processor in FIG. 3.

FIG. 5 contains a flow chart 600 for the processing of received packets in need of decryption and/or authentication through the semantic processor 400 of FIG. 3. The flowchart 600 is used for illustrating another method according to an embodiment of the invention.

Once a packet is received at the input buffer 140 or the recirculation buffer 160 and the DXP 180 begins to parse through the headers of the received packet, according to a block 610, the DXP 180 ceases parsing through the headers of the received packet because it is determined that the packet needs decryption and/or authentication. If DXP 180 begins to parse through the packet headers from the recirculation buffer 160, preferably, the recirculation buffer 160 will only contain the aforementioned specialized header and the first part of the reassembled IP packet.

According to a next block 620, the DXP 180 signals to the SPU 410 to load the appropriate microinstructions from the SCT 150 and read the received packet from input buffer 140 or recirculation buffer 160. Preferably, SPU 410 will read the packet fragments from DRAM 480 instead of the recirculation buffer 160 for data that has not already been placed in the recirculation buffer 160.

According to a next block 630, the SPU 410 writes the received packet to cryptography block 440, where the packet is authenticated, decrypted, or both. In a preferred embodiment, decryption and authentication are performed in parallel within cryptography block 440. The cryptography block 440 enables the authentication, encryption, or decryption of a packet through the use of Triple Data Encryption Standard (T-DES), Advanced Encryption Standard (AES), Message Digest 5 (MD-5), Secure Hash Algorithm 1 (SHA-1), Rivest Cipher 4 (RC-4) algorithms, etc. Although block 620 and 630 are shown as two separate steps, optionally, they can be performed as one step with the SPU 410 reading and writing the packet concurrently.

The decrypted and/or authenticated packet is then written to SPU 410 and, according to a next block 640, the SPU 410 writes the packet to the recirculation buffer 160 for further processing. In a preferred embodiment, the cryptography block 440 contains a direct memory access engine that can read data from and write data to DRAM 480. By writing the decrypted and/or authenticated packet back to DRAM 480, SPU 410 can then read just the headers of the decrypted and/or authenticated packet from DRAM 480 and subsequently write them to the recirculation buffer 160. Since the payload of the packet remains in DRAM 480, semantic processor 400 saves processing time. Like with IP fragmentation, a specialized header can be written to the recirculation buffer to orient the parser and pass CCB information back to SPU 410.

Multiple passes through the recirculation buffer 160 may be necessary when IP fragmentation and encryption/authentication are contained in a single packet received by the semantic processor 400.

Figure 6:
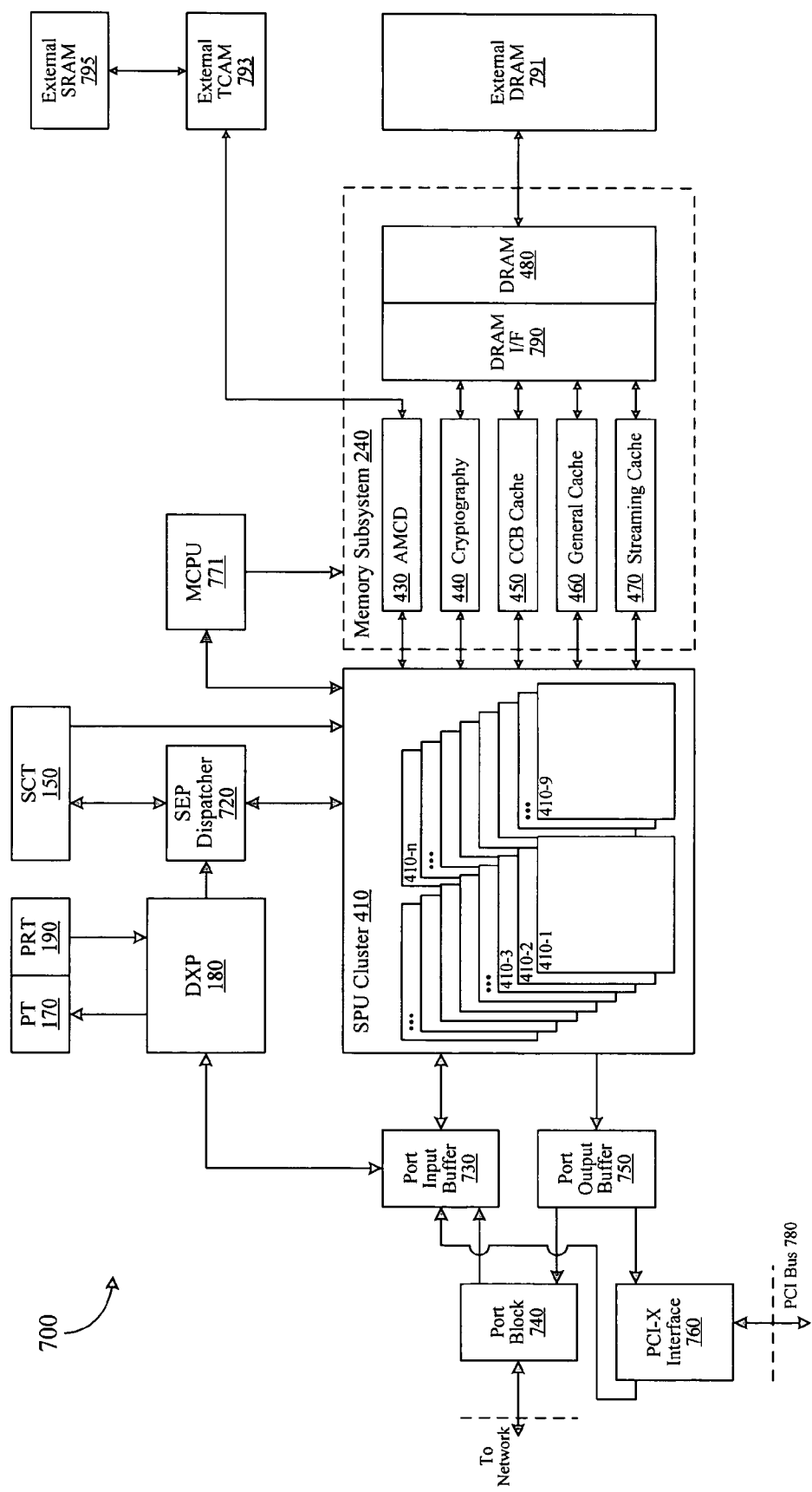
FIG. 6 illustrates yet another semantic processor implementation useful with embodiments of the invention.

FIG. 6 shows yet another semantic processor embodiment. Semantic processor 700 contains a semantic processing unit (SPU) cluster 410 containing a plurality of semantic processing units 410-1, 410-2, 410-n. Preferably, each of the SPUs 410-1 to 410-n is identical and has the same functionality. The SPU cluster 410 is coupled to the memory subsystem 240, a SPU entry point (SEP) dispatcher 720, the SCT 150, port input buffer (PIB) 730, port output buffer (POB) 750, and a machine central processing unit (MCPU) 771.

When DXP 180 determines that a SPU task is to be launched at a specific point in parsing, DXP 180 signals SEP dispatcher 720 to load microinstructions from SCT 150 and allocate a SPU from the plurality of SPUs 410-1 to 410-n within the SPU cluster 410 to perform the task. The loaded microinstructions and task to be performed are then sent to the allocated SPU. The allocated SPU then executes the microinstructions and the data packet is processed accordingly. The SPU can optionally load microinstructions from the SCT 150 directly when instructed by the SEP dispatcher 720.

The PIB 730 contains at least one network interface input buffer, a recirculation buffer, and a Peripheral Component Interconnect (PCI-X) input buffer. The POB 750 contains at least one network interface output buffer and a Peripheral Component Interconnect (PCI-X) output buffer. The port block 740 contains one or more ports, each comprising a physical interface, e.g., an optical, electrical, or radio frequency driver/receiver pair for an Ethernet, Fibre Channel, 802.11x, Universal Serial Bus, Firewire, or other physical layer interface. Preferably, the number of ports within port block 740 corresponds to the number of network interface input buffers within the PIB 730 and the number of output buffers within the POB 750.

The PCI-X interface 760 is coupled to a PCI-X input buffer within the PIB 730, a PCI-X output buffer within the POB 750, and an external PCI bus 780. The PCI bus 780 can connect to other PCI-capable components, such as disk drive, interfaces for additional network ports, etc.

The MCPU 771 is coupled with the SPU cluster 410 and memory subsystem 240. The MCPU 771 may perform any desired function for semantic processor 700 that can be reasonably accomplished with traditional software running on standard hardware. These functions are usually infrequent, non-time-critical functions that do not warrant inclusion in SCT 150 due to complexity. Preferably, the MCPU 771 also has the capability to communicate with the dispatcher in SPU cluster 410 in order to request that a SPU perform tasks on the MCPU's behalf.

In an embodiment of the invention, the memory subsystem 240 further comprises a DRAM interface 790 that couples the cryptography block 440, context control block cache 450, general cache 460, and streaming cache 470 to DRAM 480 and external DRAM 791. In this embodiment, the AMCD 430 connects directly to an external TCAM 793, which, in turn, is coupled to an external Static Random Access Memory (SRAM) 795.

Figure 7:
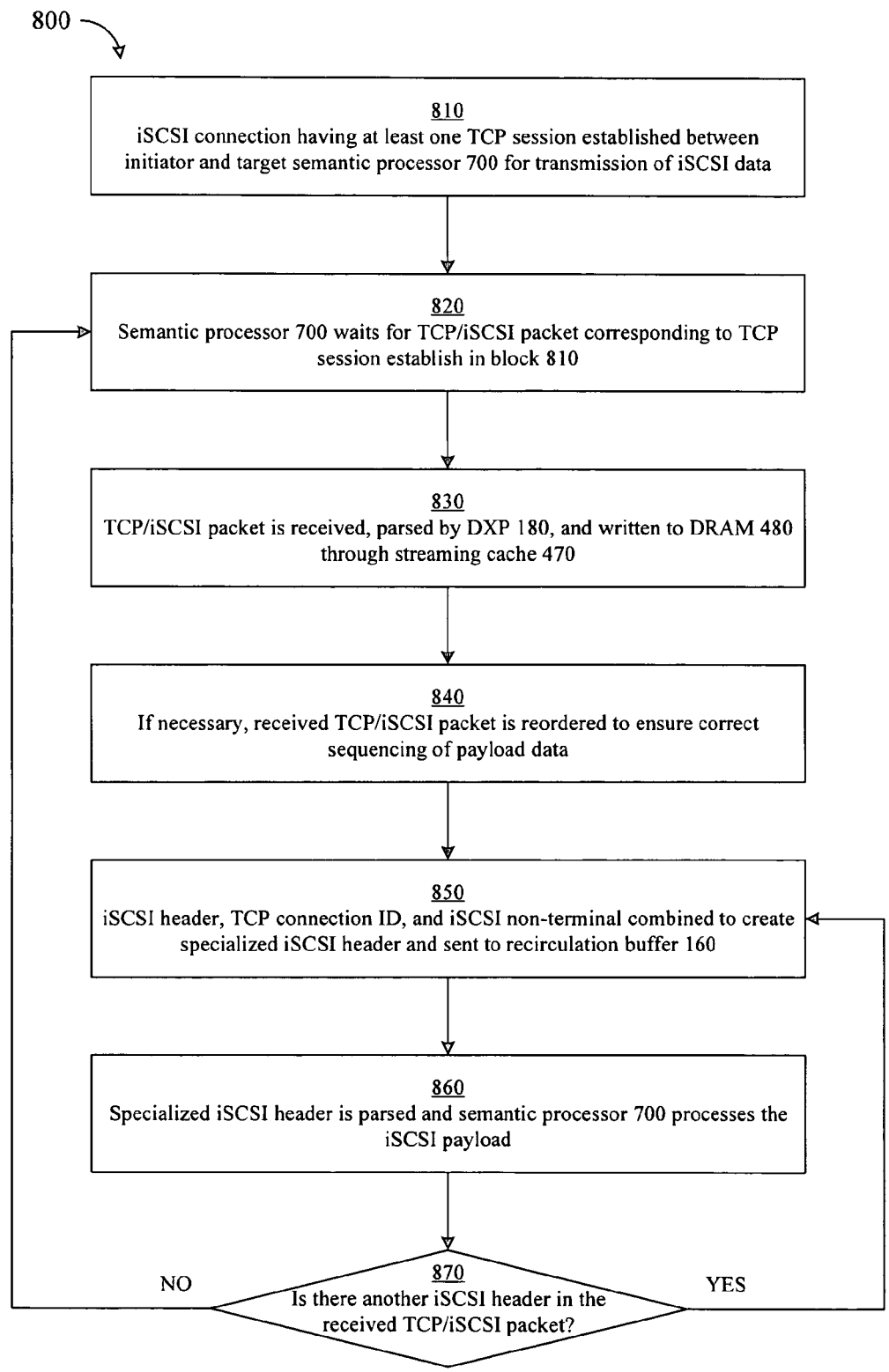
FIG. 7 contains a flow chart of received iSCSI packets through a TCP connection in the semantic processor in FIG. 6.

FIG. 7 contains a flow chart 800 for the processing of received Internet Small Computer Systems Interface (iSCSI) data through the semantic processor 700 of FIG. 6. The flowchart 800 is used for illustrating another method according to an embodiment of the invention.

According to a block 810, an iSCSI connection having at least one Transmission Control Protocol (TCP) session is established between an initiator and the target semantic processor 700 for the transmission of iSCSI data. The semantic processor 700 contains the appropriate grammar in the PT 170 and the PRT 190 and microcode in SCT 150 to establish a TCP session and then process the initial login and authentication of the iSCSI connection through the MCPU 771. In one embodiment, one or more SPUs within the SPU cluster 410 organize and maintain state for the TCP session, including allocating a CCB in DRAM 480 for TCP reordering, window sizing constraints and a timer for ending the TCP session if no further TCP/iSCSI packets arrive from the initiator within the allotted time frame. The TCP CCB contains a field for associating that CCB with an iSCSI CCB once an iSCSI connection is established by MCPU 771.

After a TCP session is established with the initiator, according to a next block 820, semantic processor 700 waits for a TCP/iSCSI packet, corresponding to the TCP session established in block 810, to arrive at the input buffer 140 of the PIB 730. Since semantic processor 700 has a plurality of SPUs 410-1 to 410-n available for processing input data, semantic processor 700 can receive and process multiple packets in parallel while waiting for the next TCP/iSCSI packet corresponding to the TCP session established in the block 810.

A TCP/iSCSI packet is received at the input buffer 140 of the PIB 730 through the input port 120 of port block 740, and the DXP 180 parses through the TCP header of the packet within the input buffer 140. According to a next block 830, the DXP 180 signals to the SEP dispatcher 720 to load the appropriate microinstructions from the SCT 150, allocate a SPU from the SPU cluster 410, and send to the allocated SPU microinstructions that, when executed, require the allocated SPU to read the received packet from the input buffer 140 and write the received packet to DRAM 480 through the streaming cache 470. The allocated SPU then uses the AMCD's 430 lookup function to locate the TCP CCB, stores the pointer to the location of the received packet in DRAM 480 to the TCP CCB, and restarts the timer in the TCP CCB. The allocated SPU is then released and can be allocated for other processing as the DXP 180 determines.

According to a next block 840, the received TCP/iSCSI packet is reordered, if necessary, to ensure correct sequencing of payload data. As is well known in the art, a TCP packet is deemed to be in proper order if all of the preceding packets have arrived.

When the received packet is determined to be in the proper order, the responsible SPU signals the SEP dispatcher 720 to load microinstructions from the SCT 150 for iSCSI recirculation. According to a next block 850, the allocated SPU combines the iSCSI header, the TCP connection ID from the TCP header and an iSCSI non-terminal to create a specialized iSCSI header. The allocated SPU then writes the specialized iSCSI header to the recirculation buffer 160 within the PIB 730. Optionally, the specialized iSCSI header can be sent to the recirculation buffer 160 with its corresponding iSCSI payload.

According to a next block 860, the specialized iSCSI header is parsed and semantic processor 700 processes the iSCSI payload.

According to a next decision block 870, it is inquired whether there is another iSCSI header in the received TCP/iSCSI packet. If YES, then execution returns to block 850 where the second iSCSI header within the received TCP/iSCSI packet is used to process the second iSCSI payload. As is well known in the art, there can be multiple iSCSI headers and payloads in a single TCP/iSCSI packet and thus there may be a plurality of packet segments sent through the recirculation buffer 160 and DXP 180 for any given iSCSI packet.

If NO, block 870 returns execution to the block 820, where semantic processor 700 waits for another TCP/iSCSI packet corresponding to the TCP session established in the block 810. The allocated SPU is then released and can be allocated for other processing as the DXP 180 determines.

As can be understood by a person skilled in the art, multiple segments of a packet may be passed through the recirculation buffer 160 at different times when any combination of encryption, authentication, IP fragmentation and iSCSI data processing are contained in a single packet received by the semantic processor 700.

Memory Subsystem

Figure 8:
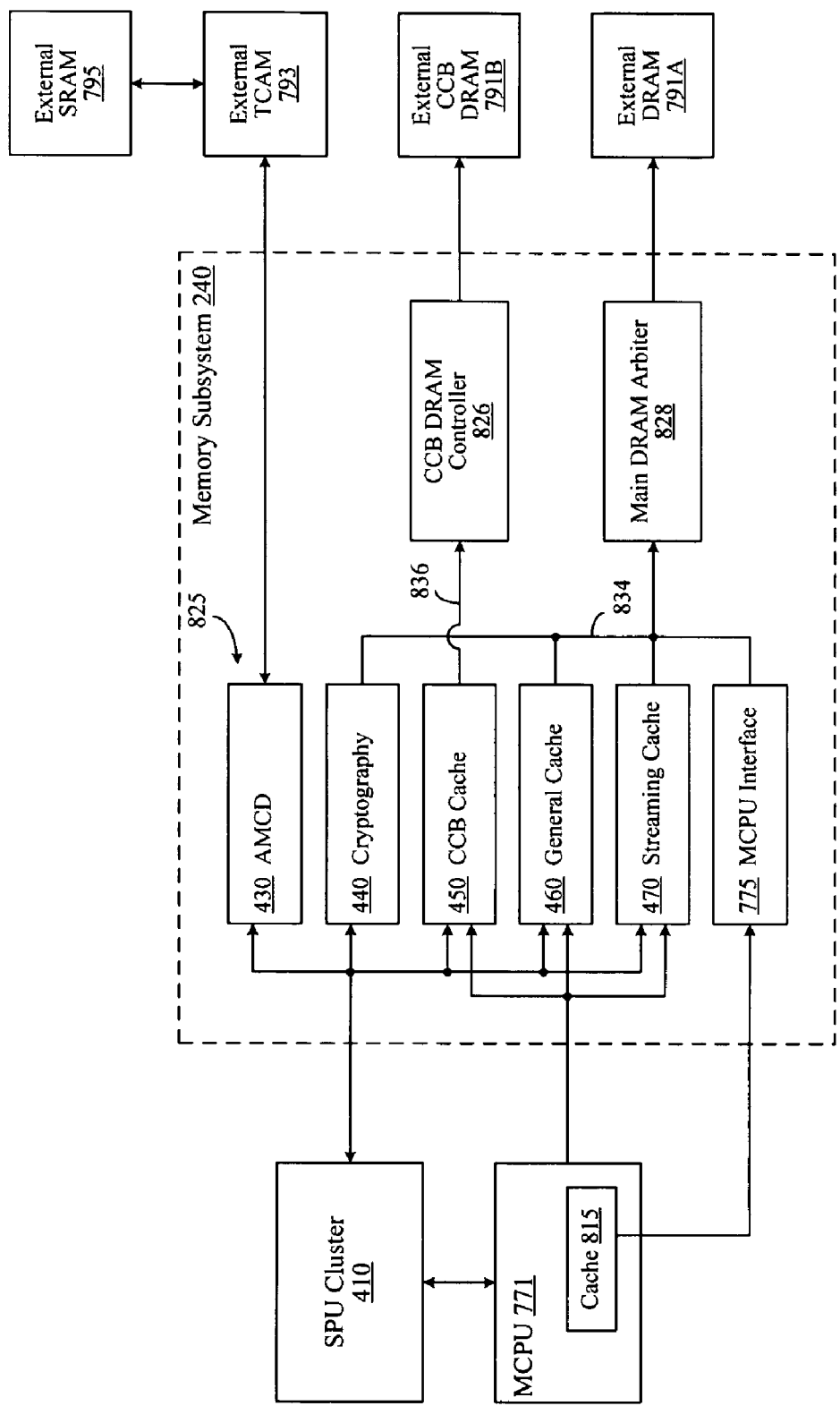

FIG. 8 shows the memory subsystem 240 in more detail. The cluster of SPUs 410 and an MCPU 771 are connected to the memory subsystem 240. In an alternative embodiment, the MCPU 771 is coupled to the memory subsystem 240 through the SPUs 410. The memory subsystem 240 includes multiple different cache regions 430, 440, 450, 460, 470, and 775 that are each adapted for different types of memory access. The multiple cache regions 430, 440, 450, 460, 470, and 775 may be referred to generally as cache regions 825. The SPU cluster 410 and the MCPU 771 communicate with any of the different cache regions 825 that then communicate with an external DRAM 791A through a main DRAM arbiter 828. In one implementation, however, the CCB cache 450 may communicate to a separate external CCB DRAM 791B through a CCB DRAM controller 826 and the AMCD 430 communicates with an external TCAM 793, which is then coupled to an external SRAM 795.

The different cache regions 825 improve DRAM data transfers for different data processing operations. The general cache 460 operates as a conventional cache for general purpose memory accesses by the SPUs 410. For example, the general cache 460 may be used for the general purpose random memory accesses used for conducting general control and data access operations.

Cache line replacement in the CCB cache 450 is controlled exclusively by software commands. This is contrary to conventional cache operation where hardware controls contents of the cache based on who occupied a cache line position last. Controlling the CCB cache region 450 with software prevents the cache from prematurely reloading cache lines that may need some intermediary processing by one or more SPUs 410 before being loaded or updated from external DRAM 791B.

The streaming cache 470 is primary used for processing streaming packet data. The streaming cache 470 prevents streaming packet transfers from replacing all the entries in, for example, the general cache 460. The streaming cache 470 is implemented as a cache instead of a First In-First Out (FIFO) memory buffer since it is possible that one or more of the SPUs 410 may need to read data while it is still located in the streaming cache 470. If a FIFO were used, the streaming data could only be read after it had been loaded into the external DRAM 791 A. The streaming cache 470 includes multiple buffers that each can contain different packet streams. This allows different SPUs 410 to access different packet streams while located in streaming cache 470.

The MCPU interface 775 is primarily used for instruction accesses from the MCPU 771. The MCPU interface 775 improves the efficiency of burst mode accesses between the MCPU 771 and the external DRAM 791 A. The MCPU 771 includes an internal cache 815 that, in one embodiment, is 32 bits wide. The MCPU interface 775 is directed specifically to handle 32-bit burst transfers. The MCPU interface 775 may buffer multiple 32-bit bursts from the MCPU 771 and then burst to the external DRAM 791A when cache lines reach some threshold amount of data.

In one embodiment, each of the cache regions 825 may map physically to different associated regions in the external DRAM 791A and 791B. This prevents the instruction transfers between the MCPU 771 and external DRAM 791 A from being polluted by data transfers conducted in other cache regions. For example, the SPUs 410 can load data through the cache regions 460, 450, and 470 without polluting the instruction space used by the MCPU 771.

S-Code

Figure 9:
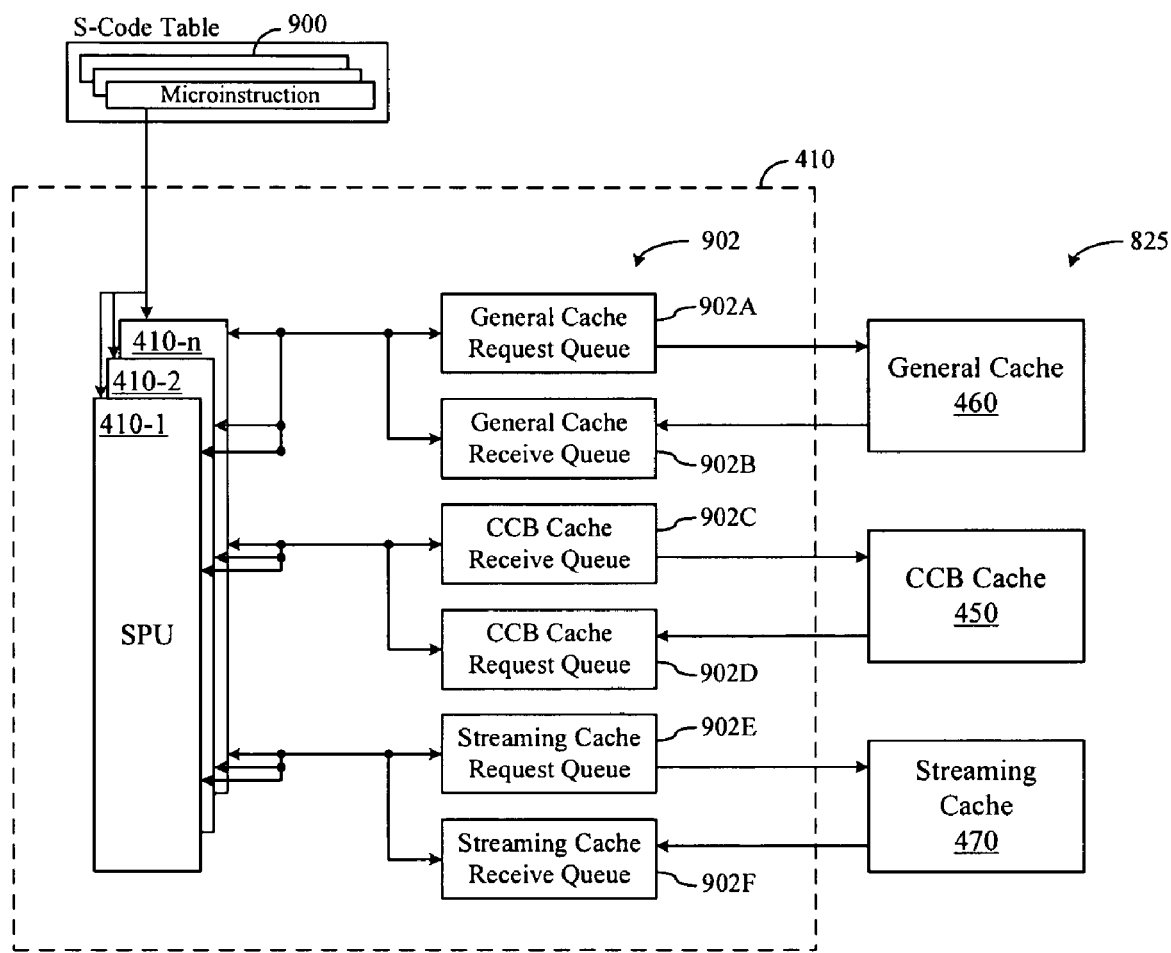

FIG. 9 shows in more detail how memory accesses are initiated by the individual SPUs 410-1, 410-2 . . . 410-n to the different cache regions 825. For simplicity, only the general cache 460, CCB cache 450, and the streaming cache 470 are shown.

Figure 10A:
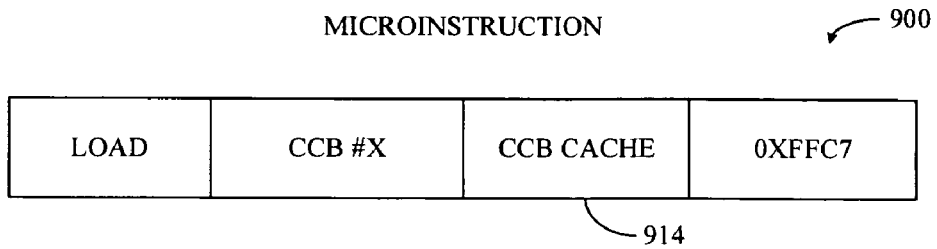

Microinstructions 900, alternatively referred to as SPU codes or S-Codes, are sent from the direct execution parser 180 (FIG. 1) to the SPU subsystem 410. An example of a microinstruction 900 is shown in more detail in FIG. 10A. The microinstruction 900 may include a target field 914 that indicates to the individual SPUs 410-1, 410-2 . . . 410-n which cache region 825 to use for accessing data. For example, the cache region field 914 in FIG. 10A directs the SPU 410-1, 410-2 . . . 410-n to use the CCB cache 450. The target field 914 can also be used to direct the SPUs 410-1, 410-2 . . . 410-n to access the MCPU interface 775 (FIG. 8), recirculation buffer 160 (FIG. 1), or output buffers 750 (FIG. 6).

Referring back to FIG. 9, each cache region 825 has an associated set of queues 902 in the SPU subsystem 410. The individual SPUs 410-1, 410-2, . . . , 410-n send data access requests to the queues 902 that then provide orderly access to the different cache regions 825. The queues 902 also allow different SPUs 710 to conduct or initiate memory accesses to the different cache regions 825 at the same time.

Figure 10B:
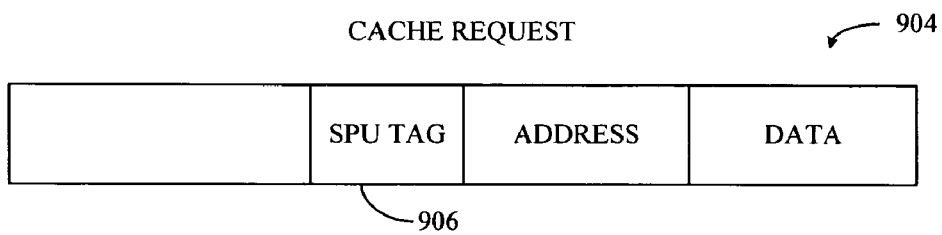

FIG. 10B shows an example of a cache request 904 sent between the SPUs 410-1, 410-2 . . . 410-n and the cache regions 825. The cache request 904 includes the address and any associated data. In addition, the cache request 904 includes a SPU tag 906 that identifies that SPU 410-1, 410-2 . . . 410-n is associated with the request 904. The SPU tag 906 tells the cache regions 825 which SPU 410-1, 410-2 . . . 410-n to send back any requested data.

Arbitration

Referring back to FIG. 8, of particular interest is the DRAM arbiter 828 that, in one embodiment, uses a round robin arbitration for determining when data from the different data cache regions 825 gain access to external DRAM 791A. In the round robin arbitration scheme, the main DRAM arbiter 828 checks, in a predetermined order, if any of the cache regions 825 has requested access to external DRAM 791A. If a particular cache region 825 makes a memory access request, it is granted access to the external DRAM 791A during its associated round robin period. The arbiter 828 then checks the next cache region 825 in the round robin order for a memory access request. If the next cache region 825 has no memory access request, the arbiter 828 checks the next cache region 825 in the round robin order. This process continues with each cache region 825 being serviced in the round robin order.

Accesses between the CCB cache 450 and external DRAM 791A can consume a large amount of bandwidth. A CCB DRAM controller 826 can be used exclusively for CCB transfers between the CCB cache 450 and a separate external CCB DRAM 791B. Two different busses 834 and 836 can be used for the accesses to the two different banks of DRAM 791A and 791B, respectively. The external memory accesses by the other cache regions 440, 460, 470, and 775 are then arbitrated separately by the main DRAM arbiter 828 over bus 834. If the CCB cache 450 is not connected to external DRAM through a separate CCB controller 826, then the main DRAM controller 828 arbitrates all accesses to the external DRAM 791A for all cache regions 825.

In another embodiment, the accesses to the external DRAM 791A and external CCB DRAM 791B are interleaved. This means that the CCB cache 450 and the other cache regions 825 can conduct memory accesses to both the external DRAM 791A and external CCB DRAM 791B. This allows two memory banks 791A and 791B to be accessed at the same time. For example, the CCB cache 450 can conduct a read operation from external memory 791A and, at the same time, conduct a write operation to external memory 791B.

General Cache

Figure 11:
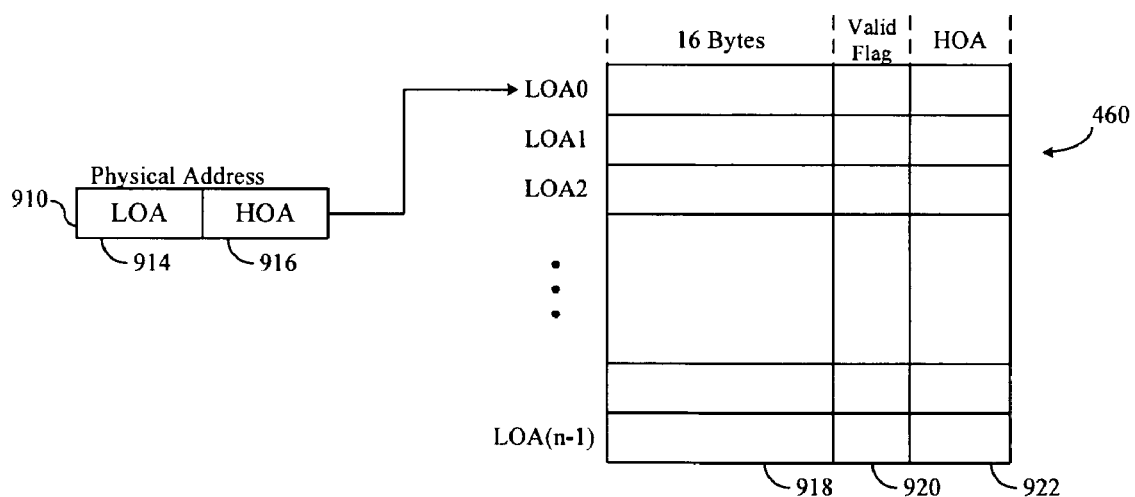

FIG. 11 shows in more detail one example of a general cache 460. The general cache 460 receives a physical address 910 from one of the SPUs 410. (FIG. 9). The cache lines 918 are accessed according to a low order address space (LOA) 916 from the physical address 910.

The cache lines 918, in one example, may be relatively small or have a different size than the cache lines used in other cache regions 825. For example, the cache lines 918 may be much smaller than the size of the cache lines used in the streaming cache 470 and the CCB cache 450. This provides more customized memory accesses for the different types of data processed by the different cache regions 825. For example, the cache lines 918 may only be 16 bytes long for general control data processing. On the other hand, the cache lines for the streaming cache 470 may have larger cache lines, such as 64 bytes, for transferring larger blocks of data.

Each cache line 918 may have an associated valid flag 920 that indicates whether or not the data in the cache line is valid. The cache lines 918 also have an associated high order address (HOA) field 922. The general cache 460 receives the physical address 910 and then checks HOA 922 and valid flag 920 for the cache line 918 associated with the LOA 916. If the valid flag 920 indicates a valid cache entry and the HOA 922 matches the HOA 914 for the physical address 910, the contents of the cache line 918 are read out to the requesting SPU 410. If flag field 920 indicates an invalid entry, the contents of cache line 918 are written over by a corresponding address in the external DRAM 791A (FIG. 8).

If flag field 920 indicates a valid cache entry, but the HOA 922 does not match the HOA 914 in the physical address 910, one of the entries in cache lines 918 is automatically loaded into the external DRAM 791A and the contents of external DRAM 791A associated with the physical address 910 is loaded into the cache lines 918 associated with the LOA 916.

Context Control Block (CCB) Cache

Figure 12:
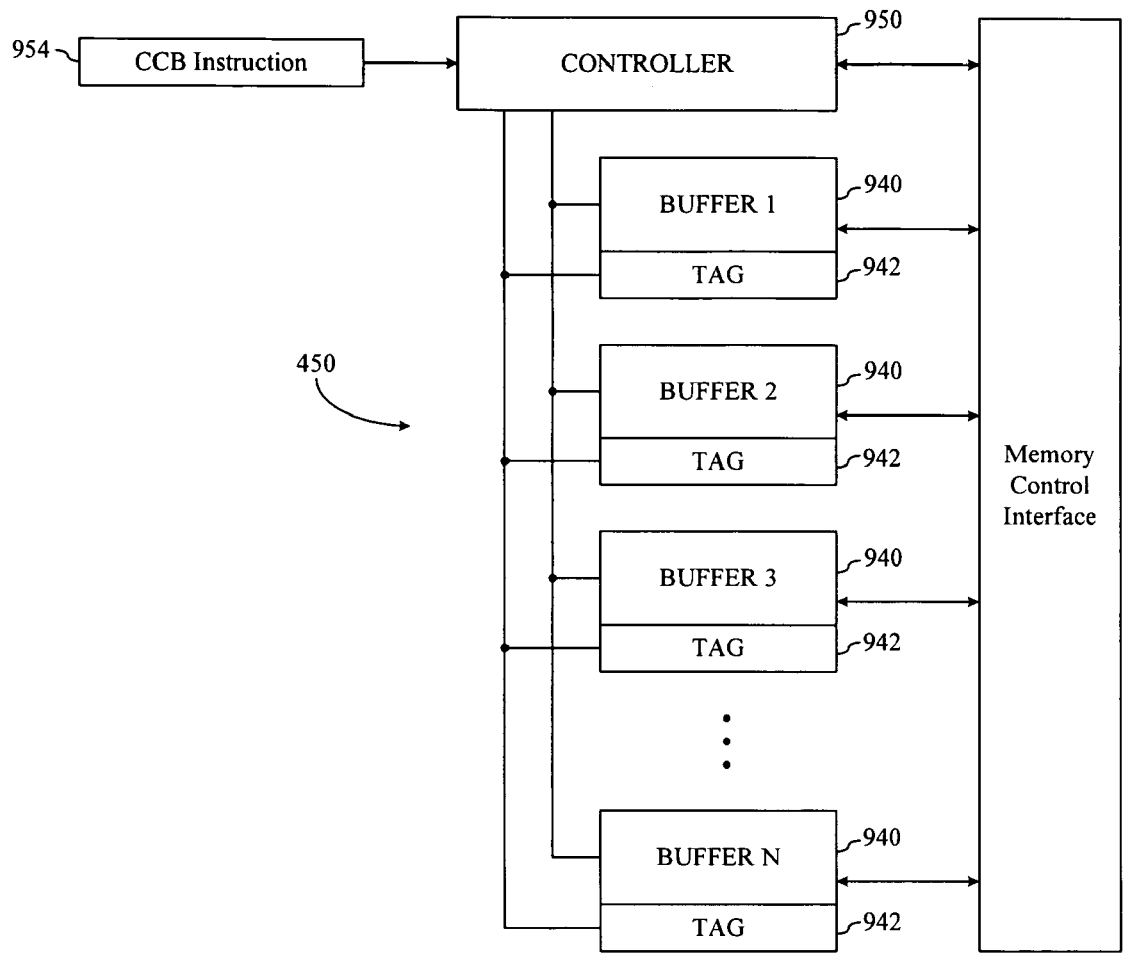

FIG. 12 shows the context control block (CCB) cache 450 in more detail. The CCB 450 includes multiple buffers 940 and associative tags 942. As opposed to a conventional 4-way associative cache, the CCB 450 operates essentially like a 32-way associative cache. The multiple CCB buffers 940 and associative tags 942 are controlled by a set of software commands sent through the SPUs 410. The software commands include a set of Cache/DRAM instructions used for controlling the transfer of data between the CCB cache 450 and the external DRAM 791A or 791B (FIG. 8) and a set of SPU/cache commands used for controlling data transfers between the SPUs 410 and the CCB cache 450. The cache/DRAM instructions include ALLOCATE, LOAD, COMMIT AND DROP operations. The SPU/cache instructions include READ and WRITE operations.

Figure 13:
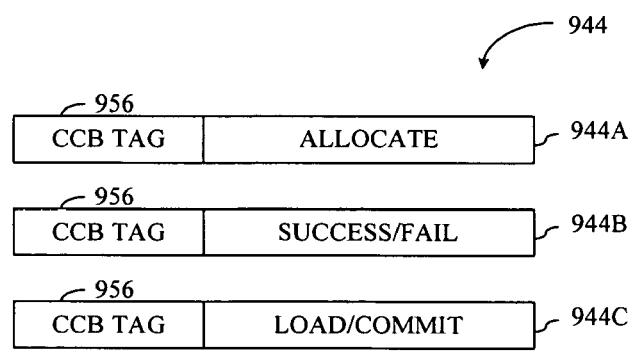

FIG. 13 shows some examples of CCB commands sent between the SPUs 410 and the CCB cache 450. Any of these software commands 944 can be issued by any SPU 410 to the CCB cache 450 at any time.

Referring to FIGS. 12 and 13, one of the SPUs 410 sends the ALLOCATE command 944A to the CCB cache 450 to first allocate one of the CCB buffers 940. The ALLOCATE command 944A may include a particular memory address or CCB tag 956 associated with a physical address in DRAM 791 containing a CCB. The controller 950 in the CCB cache 450 conducts a parallel match of the received CCB address 956 with the addresses or tags associated with the each of the buffers 940. The addresses associated with each buffer 940 are contained in the associated tag fields 942.

If the address/tag 956 is not contained in any of the tag fields 942, the controller 950 allocates one of the unused buffers 940 to the specified CCB tag 956. If the address already exists in one of the tag fields 942, the controller 950 uses the buffer 940 already associated with the specified CCB tag 956.

The controller 950 sends back a reply 944B to the requesting SPU 410 that indicates whether or not a CCB buffer 940 has been successfully allocated. If a buffer 940 is successfully allocated, the controller 950 maps all CCB commands 944 from all SPUs 410 that use the CCB tag 956 to the newly allocated buffer 940.

There are situations where the SPUs 410 may not care about the data that is currently in the external DRAM 791 for a particular memory address, such as, for example, when the data in external DRAM 791 is going to be overwritten. In conventional cache architectures, the contents of any specified address not currently contained in the cache is automatically loaded into the cache from main memory. However, the ALLOCATE command 944A simply allocates one of the buffers 940 without having to first read in data from the DRAM 791. Thus, the buffers 940 can also be used as scratch pads for intermediate data processing without ever reading or writing the data in buffers 940 into or out of the external DRAM 791.

The LOAD and COMMIT software commands 944C are required to complete the transfer of data between one of the cache buffers 940 and the external DRAM 791. For example, a LOAD command is sent from a SPU 410 to the controller 950 to load a CCB associated with a particular CCB tag 956 from external DRAM 791 into the associated buffer 940 in CCB cache 450. The controller 950 may convert the CCB tag 956 into a physical DRAM address and then fetch a CCB from the DRAM 791 associated with the physical DRAM address.

A COMMIT command is sent by a SPU 410 to write the contents of a buffer 940 into a physical address in DRAM 791 associated with the CCB tag 956. The COMMIT command also causes the controller 950 to deallocate the buffer 940, making it available for allocating to another CCB. However, another SPU 410 can later request buffer allocation for the same CCB tag 956. The controller 950 uses the existing CCB currently located in buffer 940 if the CCB still exists in one of the buffers 940.

A DROP command tells the controller 950 to discard the contents of a particular buffer 940 associated with a specified CCB tag 956. The controller 950 discards the CCB simply by deallocating the buffer 940 in CCB cache 450 without ever loading the buffer contents into external DRAM 791.

READ and WRITE instructions are used to transfer CCB data between the CCB cache 450 and the SPUs 410. The READ and WRITE instructions only allow a data transfer between the SPUs 410 and the CCB cache 450 when a buffer 940 has previously been allocated.

If all the available buffers 940 are currently in use, then one of the SPUs 410 will have to COMMIT one of the currently used buffers 940 before the current ALLOCATE command can be serviced by the CCB cache 450. The controller 950 keeps track of which buffers 940 are assigned to different CCB addresses. The SPUs 410 only need to keep a count of the number of currently allocated buffers 940. If the count number reaches the total number of available buffers 940, one of the SPUs 410 may issue a COMMIT or DROP command to free up one of the buffers 940. In one embodiment, there are at least twice as many buffers 940 as SPUs 410. This enables all SPUs 410 to have two available buffers 940 at the same time.

Because the operations in the CCB cache 450 are under software control, the SPUs 410 control when buffers 940 are released and transfer data to the external DRAM 791A or 791B. In addition, one SPU 410 that initially allocates a buffer 940 for a CCB can be different from the SPU 410 that issues the LOAD command or different from the SPU 410 that eventually releases the buffer 940 by issuing a COMMIT or DROP command.

The commands 944 allow complete software control of data transfers between the CCB cache 450 and DRAM 791A or DRAM 791B. This has substantial advantages when packet data is being processed by one or more SPUs 410 and when it is determined during packet processing that a particular CCB no longer needs to be loaded into or read from DRAM 791A or DRAM 791B. For example, one of the SPUs 410 may determine during packet processing that the packet has an incorrect checksum value. The packet can be DROPPED from the CCB buffer 940 without ever loading the packet into DRAM 791A or DRAM 791B.

The buffers 940 in one embodiment are implemented as cache lines. Therefore, only one cache line ever needs to be written back into external DRAM 791A or DRAM 791B. In one embodiment, the cache lines are 512 bytes and the words are 64 bytes wide. The controller 950 can recognize which cache lines have been modified and, during a COMMIT command, only write back the cache lines that have been changed in buffers 940.

Figure 14:
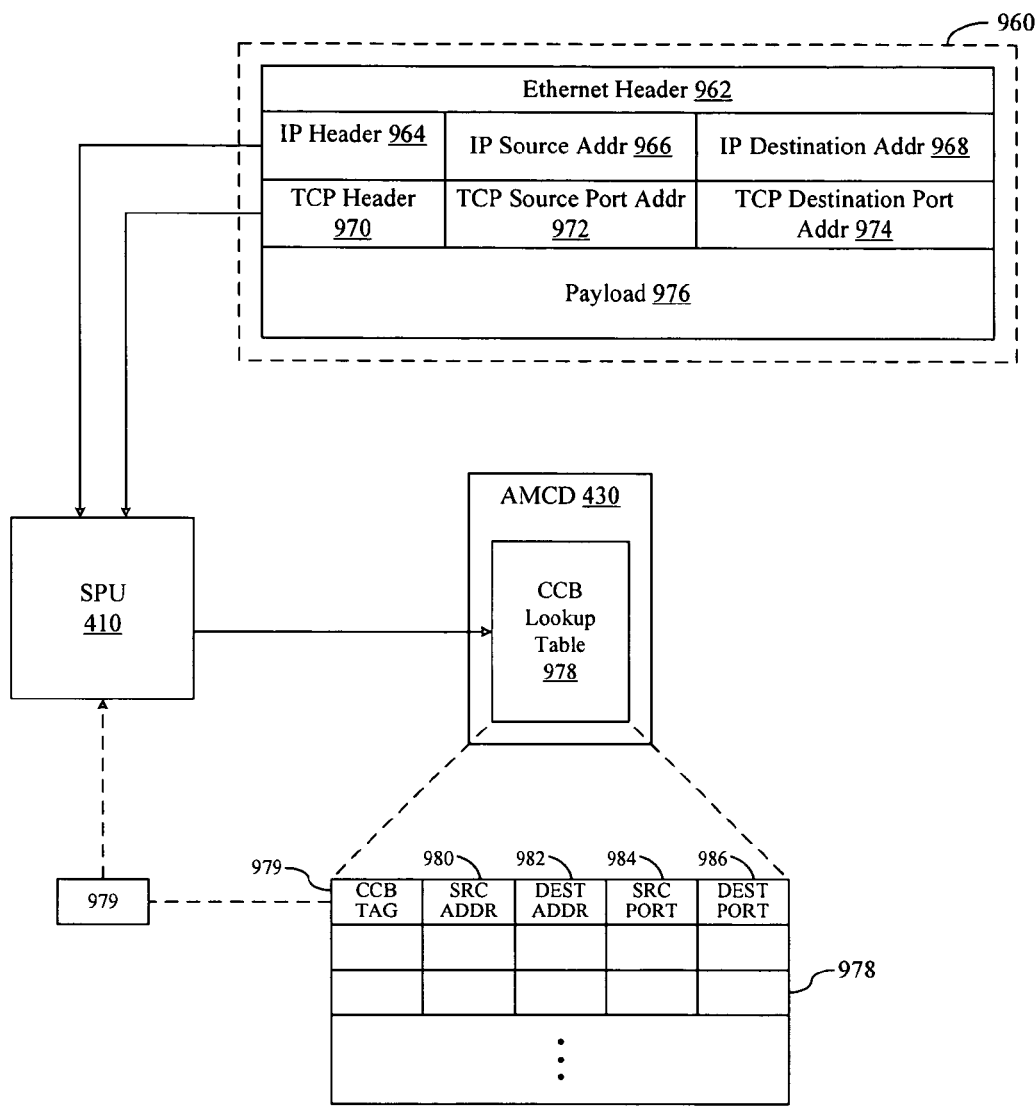

FIG. 14 shows an example of how CCBs are used when processing TCP sessions. The semantic processor 100 (FIG. 1) can be used for processing any type of data; however, a TCP packet 960 is shown for explanation purposes. The packet 960 in this example includes an Ethernet header 962, an IP header 964, IP source address 966, IP destination address 968, TCP header 970, TCP source port address 972, TCP destination port address 974, and a payload 976.

The direct execution parser 180 directs one or more of the SPUs 410 to obtain the source address 966 and destination address 968 from the IP header 964 and obtain the TCP source port address 972 and TCP destination port address 974 from the TCP header 970. These addresses may be located in the input buffer 140 (FIG. 1).

The SPU 410 sends the four address values 966, 968, 972 and 974 to a CCB lookup table 978 in the AMCD 430. The lookup table 978 includes arrays of IP source address fields 980, IP destination address fields 982, TCP source port address fields 984, and TCP destination port address fields 986. Each unique combination of addresses has an associated CCB tag 979.

The AMCD 430 tries to match the four address values 966, 968, 972 and 974 with four entries in the CCB lookup table 978. If there is no match, the SPU 410 will allocate a new CCB tag 979 for the TCP session associated with packet 960 and the four address values are written into table 978. If a match is found, then the AMCD 430 returns the CCB tag 979 for the matching combination of addresses.

If a CCB tag 979 is returned, the SPU 410 uses the returned CCB tag 979 for subsequent processing of packet 960. For example, the SPU 410 may load particular header information from the packet 960 into a CCB located in CCB cache 450. In addition, the SPU 410 may send payload data 976 from packet 960 to the streaming cache 470 (FIG. 8).

Figure 15:
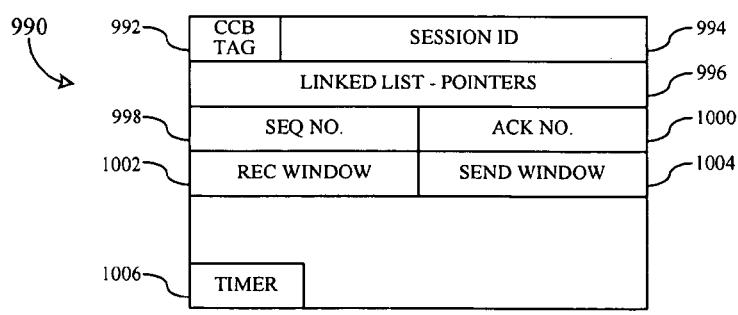

FIG. 15 shows some of the control information that may be contained in a CCB 990. The CCB 990 may contain the CCB tag 992 along with a session ID 994. The session ID 994 may contain the source and destination address for the TCP session. The CCB 990 may also include linked list pointers 996 that identify locations in external DRAM 791A or DRAM 791B that contain the packet payload data. The CCB 990 can also contain a TCP sequence number 998 and an acknowledge number 1000. The CCB 990 can include any other parameters that may be needed to process the TCP session. For example, the CCB 990 may include a receive window field 1002, send window field 1004, and a timer field 1006.

All of the TCP control fields are located in the same associated CCB 990. This allows the SPUs 410 to quickly access all of the associated fields for the same TCP session from the same CCB buffer 940 in the CCB cache 450. Further, because the CCB cache 450 is controlled by software, the SPUs 410 can maintain the CCB 990 in the CCB cache 450 until all required processing is completed by all the different SPUs 410.

There could also be CCBs 990 associated with different OSI layers. For example, there may be CCBs 990 associated and allocated with SCSI sessions and other CCBs 990 associated and allocated for TCP sessions within the SCSI sessions.

Figure 16:
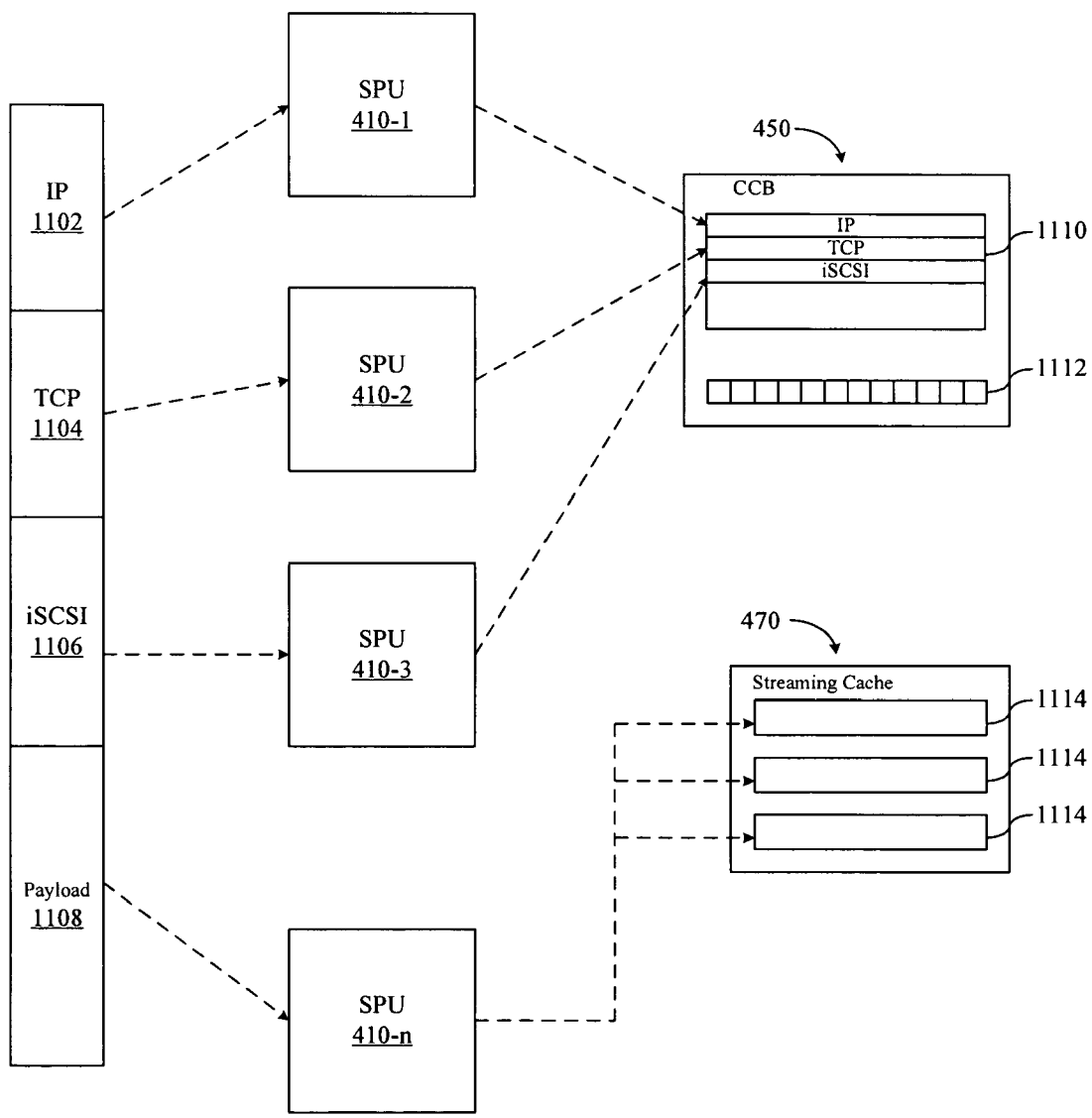

FIG. 16 shows how flags 1112 are used in the CCB cache 450 to indicate when SPUs 410 are finished processing the CCB contents in buffers 940 and when the buffers 940 are available to be released for access by another SPU.

An IP packet 1100 is received by the processing system 100 (FIG. 1). The IP packet 1100 has header sections including an IP header 1102, TCP header 1104 and ISCSI header 1106. The IP packet 1100 also includes a payload 1108 containing packet data. The parser 180 (FIG. 1) may direct different SPUs 410 to process the information in the different IP header 1102, TCP header 1104, ISCSI header 1106 and the data in the payload 1108. For example, SPU 410-1 processes the IP header information 1102, SPU 410-2 processes the TCP header information 1104, and SPU 410-3 processes the iSCSI header information 1106. Another SPU 410-$n$ may be directed to load the packet payload 1108 into buffers 1114 in the streaming cache 470. Of course, any combination of SPUs 410 can process any of the header and payload information in the IP packet 1100.

All of the header information in the IP packet 1100 can be associated with a same CCB 1110. The SPUs 410-1, 410-2, and 410-3 store and access the CCB 1110 through the CCB cache 450. The CCB 1110 also includes a completion bit mask 1112. The SPUs 410-1, 410-2, and 410-3 logically OR a bit in the completion mask 1112 when their task is completed. For example, SPU 410-1 may set a first bit in the completion bit mask 1112 when processing of the IP header 1102 is completed in the CCB 1110. SPU 410-2 may set a second bit in the completion bit mask 1112 when processing for the TCP header 1104 is complete. When all of the bits in the completion bit mask 1112 are set, this indicates that SPU processing is completed on the IP packet 1100.

Thus, when processing is completed for the payload 1108, SPU 410-$n$ checks the completion mask 1112. If all of the bits in mask 1112 are set, SPU 410-$n$ may, for example, send a COMMIT command to the CCB cache 450 (see FIG. 12) that directs the CCB cache 450 to COMMIT the contents of the cache lines containing CCB 1110 into external DRAM 791A or DRAM 791B.

Streaming Cache

Figure 17A:
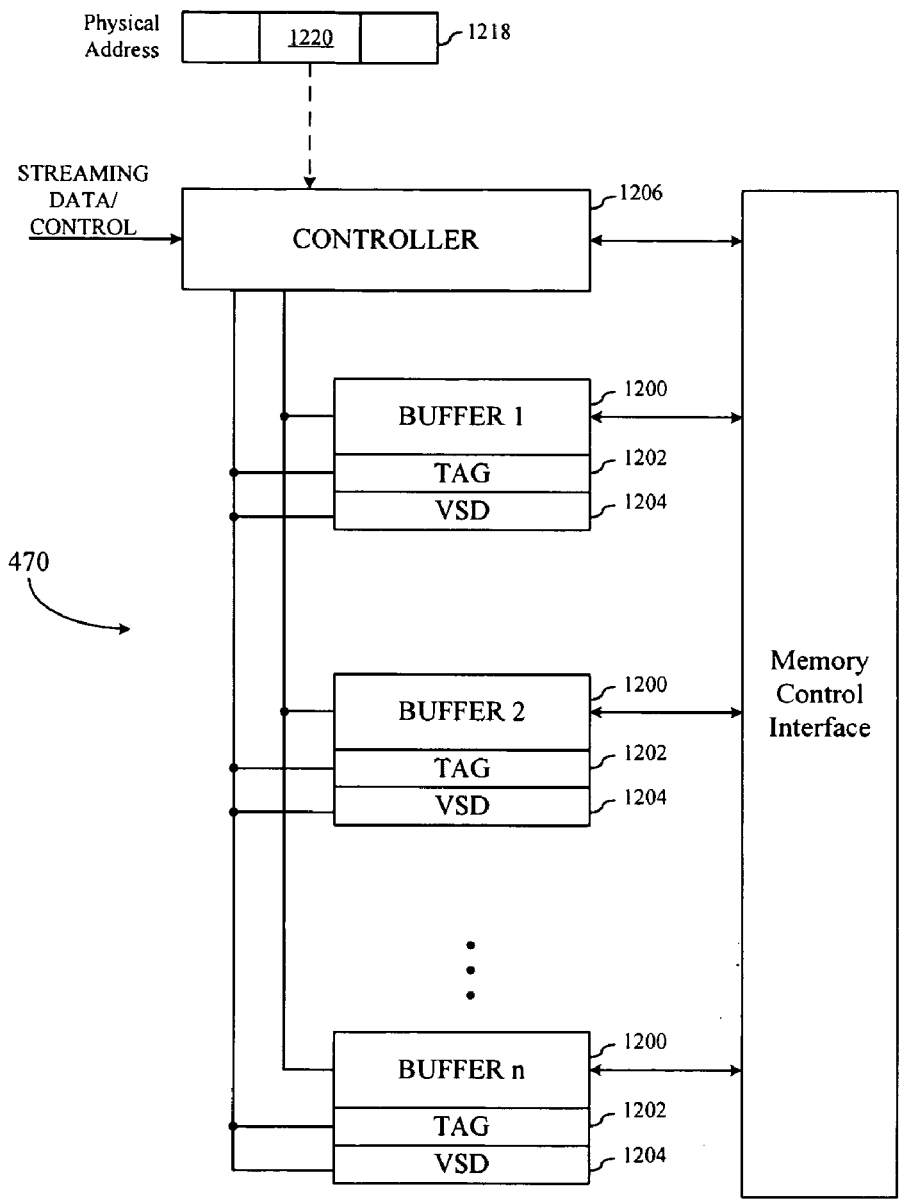

FIG. 17A shows the streaming cache 470 in more detail. In one embodiment, the streaming cache 470 includes multiple buffers 1200 used for transmitting or receiving data from the DRAM 791A (FIG. 8). The buffers 1200 in one example are 256 bytes wide, and each cache line includes a tag field 1202, a VSD field 1204, and a 64-byte portion of the buffer 1200. Thus, four cache lines are associated with each buffer 1200. The streaming cache 470 in one implementation includes two buffers 1200 for each SPU 410.

The VSD field 1204 includes a Valid value that indicates a cache line as valid/invalid, a Status value that indicates a dirty or clean cache line, and a Direction value that indicates a read, write, or no merge condition.

Figure 17B:
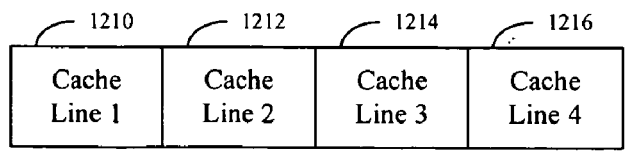

Of particular interest is a pre-fetch operation conducted by the streaming cache controller 1206. A physical address 1218 is sent to the controller 1206 from one of the SPUs 410 requesting a read from the DRAM 791A. The controller 1206 associates the physical address with one of the cache lines, such as cache line 1210, as shown in FIG. 17B. The streaming cache controller 1206 then automatically conducts a pre-fetch for the three other 64-byte cache lines 1212, 1214 and 1216 associated with the same FIFO order of bytes in the buffer 1200.

One important aspect of the pre-fetch operation is the way that the tag fields 1202 are associated with the different buffers 1200. The tag fields 1202 are used by the controller 1206 to identify a particular buffer 1200. The portion of the physical address 1218 associated with the tag fields 1202 is selected by the controller 1206 to prevent the buffers 1200 from containing contiguous physical address locations. For example, the controller 1206 may use middle order bits 1220 of the physical address 1218 to associate with tag fields 1202. This prevents the pre-fetch of the three contiguous cache lines 1212, 1214, and 1216 from colliding with streaming data operations associated with cache line 1210.

For example, one of the SPUs 410 may send a command to the streaming cache 470 with an associated physical address 1218 that requires packet data to be loaded from the DRAM memory 791A into the first cache line 1210 associated with a particular buffer 1200. The buffer 1200 having a tag value 1202 is associated with a portion of the physical address 1218. The controller 1206 may then try to conduct the pre-fetch operations to also load the cache lines 1212, 1214 and 1216 associated with the same buffer 1200. However, the pre-fetch is stalled because the buffer 1200 is already being used by the SPU 410. In addition, when the pre-fetch operations are allowed to complete, they could overwrite the cache lines in the buffer 1200 that were already loaded pursuant to other SPU commands.

By obtaining the tag values 1202 from middle order bits 1220 of the physical address 1218, each consecutive 256-byte physical address boundary will be located in a different memory buffer 1200 and, thus, will avoid collisions during the pre-fetch operations.

AMCD

Figure 18:
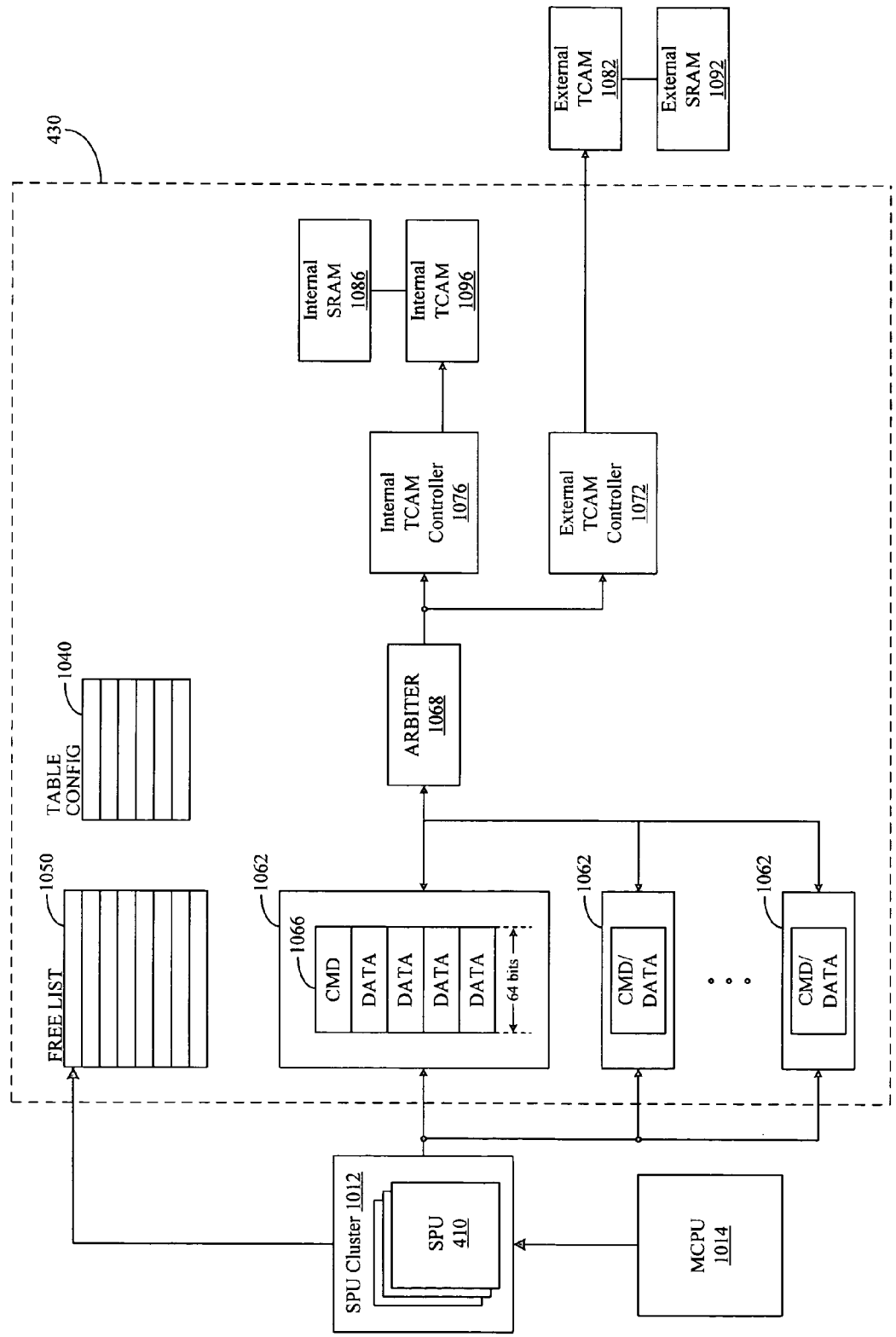

FIG. 18 illustrates a functional block diagram of an example embodiment of the AMCD 430 of FIG. 6. The SPU cluster 1012 communicates directly to the AMCD 430, while the MCPU 1014 can communicate to the AMCD 430 through the SPUs 410 in the SPU cluster 1012. The AMCD 430 provides a memory lookup facility for the SPUs 410. In one example, a SPU 410 determines where in memory, e.g., within the external DRAM 791 (FIG. 6), a previously stored entry is stored. The lookup facility in the AMCD 430 can look up where data is stored anywhere in the network system and is not limited to the external DRAM 791.

When the system is in a non-learning mode, a SPU 410 maintains its own table of memory mappings, and the SPU 410 manages its table by adding, deleting, and modifying entries. When the system is in a learning mode, a SPU 410 maintains the table by performing commands that search the TCAM memory while also adding an entry, or that search the TCAM memory while also deleting an entry. Key values are used by the SPU 410 in performing each of these different types of searches, in either mode.

Figures 19, 20:
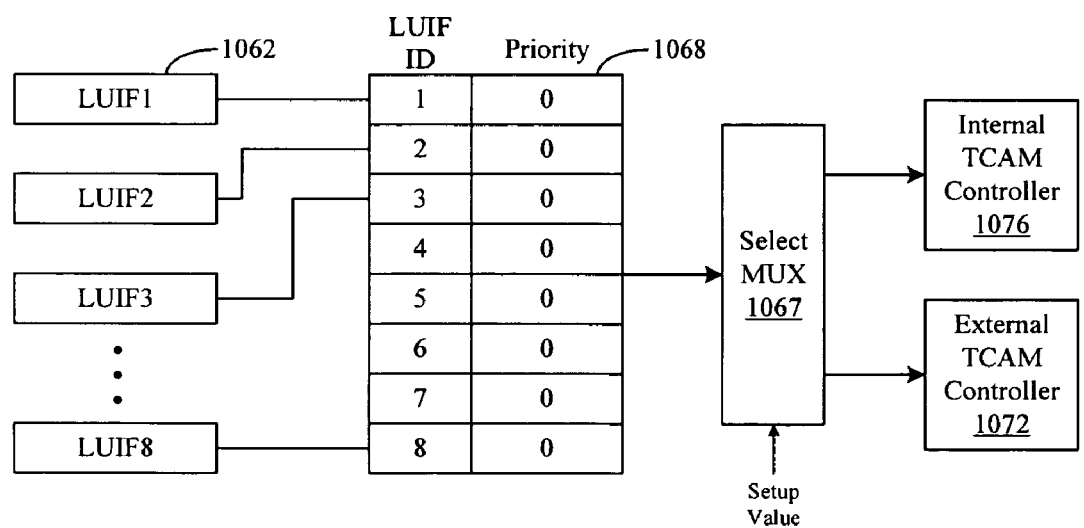

The AMCD 430 of FIG. 18 includes a set of lookup interfaces (LUIFs) 1062. In one embodiment, there are eight LUIFs 1062 in the AMCD 430. Detail of an example LUIF is illustrated, which includes a set of 64-bit registers 1066. The registers 1066 provide storage for data and commands to implement a memory lookup, and the lookup results are also returned via the registers 1066. In one embodiment, there is a single 64-bit register for the lookup command, and up to seven 64-bit registers to store the data. Not all data registers need be used. In some embodiments of the invention, a communication interface between the SPU cluster 1012 and the LUIFs 1062 is 64 bits wide, which makes it convenient to include 64-bit registers in the LUIFs 1062. An example command structure is illustrated in FIG. 19, the contents of which will be described below.

Because there is a finite number of LUIFs 1062 in a designed system, and because LUIFs cannot be accessed by more than one SPU 410 at a time, there is a mechanism to allocate free LUIFs to a SPU 410. A free list 1050 manages the usage of the LUIFs 1062. When a SPU 410 desires to access a LUIF 1062, the SPU reads the free list 1050 to determine which LUIFs 1062 are in use. After reading the free list 1050, the address of the next available free LUIF 1062 is returned, along with a value that indicates the LUIF 1062 is able to be used. If the returned value about the LUIF 1062 is valid, the SPU 410 can safely take control of that LUIF. Then an entry is made in the free list 1050 that the particular LUIF 1062 cannot be used by any other SPU 410 until the first SPU releases the LUIF. After the first SPU 410 finishes searching and gets the search results back, the SPU puts the identifier of the used LUIF back on the free list 1050, and the LUIF is again available for use by any SPU 710. If there are no free LUIFs 1062 in the free list 1050, the requesting SPU 410 will be informed that there are no free LUIFs, and the SPU will be forced to try again later to obtain a free LUIF 1062. The free list 1050 also provides a pipelining function that allows SPUs 410 to start loading indexes while waiting for other SPU requests to be processed.

The selected LUIF sends the lookup command and data to an arbiter 1068, described below. The arbiter 1068 selects which particular LUIF 1062 accesses a particular TCAM controller. In this described embodiment, there is an external TCAM controller 1072 as well as an internal TCAM controller 1076. The external TCAM controller 1072 is coupled to an external TCAM 1082, which, in turn, is connected to an external SRAM 1092. Similarly, the internal TCAM controller 1076 is coupled to an internal TCAM 1096, which, in turn, is coupled to an internal SRAM 1086.

Typically, only one TCAM, either the internal TCAM 1096 or the external TCAM 1082 would be active in the system at any one time. In other words, if the system includes the external TCAM 1082 and SRAM 1092, then AMCD 430 communicates with these external memories. Similarly, if the system does not include the external TCAM 1082 and SRAM memories 1092, then the AMCD 430 communicates only with the internal TCAM 1096 and the internal SRAM 1086. As follows, only one TCAM controller 1076 or 1072 would be used depending on whether the external memory was present. The particular controller 1072 or 1076 that is not used by the AMCD 430 would be "turned off" in a setup process. In one embodiment, a setup command is sent to the AMCD 430 upon system initialization that indicates if an external TCAM 1082 is present. If the external TCAM 1082 is present, the internal TCAM controller 1076 is "turned off," and the external TCAM controller 1072 is used. In contrast, if the external TCAM 1082 is not present, then the external TCAM controller 1072 is "turned off," and the internal TCAM controller 1076 is used. Although it is preferable to use only one TCAM controller, either 1076 or 1072, for simplicity, the AMCD 430 could be implemented to use both TCAM controllers 1076 and 1072.

In an example embodiment, the internal TCAM 1096 includes 512 entries, as does the internal SRAM 1086. In other example embodiments, the external TCAM 1082 includes 64 k to 256 k entries (an entry is 72 bits and multiple entries can be ganged together to create searches wider than 72 bits), with a matching number of entries in the external SRAM 1092. The SRAMs 1086, 1092 are typically 20 bits wide, while the TCAMs 1096, 1082 are much wider. The internal TCAM 1096 could be, for example, 164 bits wide, while the external TCAM 1082 could be in the range of between 72 and 448 bits wide, for example.

When a SPU 410 performs a lookup, it builds a key from the packet data, as described above. The SPU 410 reserves one of the LUIFs 1062 and then loads a command and data into the registers 1066 of the LUIF 1062. When the command and data are loaded, the search commences in one of the TCAMs 1096 or 1082. The command from the register 1066 is passed to the arbiter 1068, which in turn sends the data to the appropriate TCAM 1096, 1082. Assume, for example, that the external TCAM 1082 is present and, therefore, is in use. For the TCAM command, the data sent by the SPU 410 is presented to the external TCAM controller 1072, which presents the data to the external TCAM 1082. When the external TCAM 1082 finds a match of the key data, corresponding data is retrieved from the external SRAM 1092. In some embodiments, the SRAM 1092 stores a pointer to the memory location that contains the desired data indexed by the key value stored in the TCAM 1082. The pointer from the SRAM 1092 is returned to the requesting SPU 410, through the registers 1066 of the original LUIF 1062 used by the original requesting SPU 410. After the SPU 410 receives the pointer data, it releases the LUIF 1062 by placing its address back in the free list 1050, for use by another SPU 710. The LUIFs 1062, in this manner, can be used for search, write, read, or standard maintenance operations on the DRAM 791 or other memory anywhere in the system.

Using these methods, the TCAM 1082 or 1096 is used for fast lookups in CCB DRAM 791B (FIG. 8). The TCAM 1082 or 1096 can also be used for applications where a large number of sessions need to be looked up for CCBs for IPv6 at the same time. The TCAM 1082 or 1096 can also be used for implementing a static route table that needs to lookup port addresses for different IP sessions.

A set of configuration register tables 1040 is used in conjunction with the key values sent by the SPU 410 in performing the memory lookup. In one embodiment, there are 16 table entries, each of which can be indexed by a four-bit indicator, 0000-1111. For instance, data stored in the configuration table 1040 can include the size of the key in the requested lookup. Various sized keys can be used, such as 64, 72, 128, 144, 164, 192, 256, 288, 320, 384, and 448, etc. Particular key sizes and where the keyed data will be searched, as well as other various data, are stored in the configuration table 1040. With reference to FIG. 19, a table identifier number appears in the bit locations 19:16, which indicates which value in the configuration table 1040 will be used.

FIG. 20 illustrates an example arbiter 1068. The arbiter 1068 is coupled to each of the LUIFs 1062, and to a select MUX 1067 that is coupled to both the internal and external TCAM controllers 1076, 1072. As described above, in some embodiments of the invention, only one TCAM controller 1076 or 1072 is active at one time, which is controlled by the signal sent to the select MUX 1067 at startup. In this embodiment, the arbiter 1068 does not distinguish whether its output signal is sent to the internal or external TCAM controller 1076, 1072. Instead, the arbiter 1068 simply sends the output signal to the select MUX 1067, and the MUX 1067 routes the lookup request to the appropriate TCAM controller 1076, 1072, based on the state of the setup value input to the MUX 1067.

The function of the arbiter 1068 is to select which of the LUIFs 1062, LUIF1, LUIF2, ..., LUIF8, will be serviced next by the selected TCAM controller 1076 or 1072. The arbiter 1068, in its most simple form, can be implemented as simply a round-robin arbiter, where each LUIF 1062 is selected in succession. In more intelligent systems, the arbiter 1068 uses a past history to assign a priority value describing which LUIF 1062 should be selected next, as described below.

In a more intelligent arbiter 1068, a priority system indicates which LUIF 1062 was most recently used and factors this into the decision of which LUIF 1062 to select for the next lookup operation. FIG. 21 illustrates an example of arbitration in an example intelligent arbiter 1068. At Time A, each of the priority values have already been initialized to "0", and LUIF1 and LUIF7 both have operations pending. Because the arbiter 1068 selects only one LUIF 1062 at a time, LUIF3 is arbitrarily chosen because all LUIFs having pending operations also have the same priority, in this case, "0." Once LUIF3 is chosen, its priority is set to 1. In Time B, LUIF3 has a new operation pending, while LUIF7 still has an operation that has not been served. The arbiter 1068, in this case, selects LUIF7, because it has a "higher" priority than LUIF3. This ensures fair usage by each of the LUIFs 1062, and that no one LUIF monopolizes the lookup time.

In Time C, LUIF1 and LUIF3 have operations pending and the arbiter 1068 selects LUIF1 because it has a higher priority, even though the operation in LUIF3 has been pending longer. Finally, in Time D, only LUIF3 has an operation pending, and the arbiter 1068 selects LUIF3, and moves its priority up to "2".

In this manner, the arbiter 1068 implements intelligent round-robin arbitration. In other words, once a particular LUIF 1062 has been selected, it moves to the "end of the line," and all of the other LUIFs having pending operations will be serviced before the particular LUIF is again chosen. This equalizes the time each LUIF 1062 uses in its lookups, and ensures than no one particular LUIF monopolizes all of the lookup bandwidth.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A device, comprising:
   a plurality of interface circuits configured for communicating between a plurality of semantic processing units and a memory, wherein at least one of the interface circuits to receive one or more data operation requests from at least one of the semantic processing units;

a buffer having one or more entries utilized when allocating an interface circuit from the plurality of interface circuits to one of the semantic processing units associated with the data operation request; and a selection circuit coupled between the plurality of interface circuits and a content-memory, the selection circuit to select one or more of the allocated interface circuits to access the memory for processing the data operation requests.

2. The device of claim 1, wherein the memory comprises content-addressable memory.

3. The device of claim 2, wherein the memory further comprises a data storage area coupled to the content-addressable memory for storing data associated with information stored in the content-addressable memory.

4. The device of claim 1, wherein the selection circuit performs the selection of the allocated interface circuits in a round-robin fashion.

5. The device of claim 1, wherein each of the plurality of interface circuits is assigned a priority value corresponding to when each interface circuit was selected for processing the data operation request, and wherein the selection circuit performs the selection of the allocated interface circuits based on the assigned priority values.

6. The device of claim 1 where each semantic processing unit capable of allocating each of the interface circuits with data operation requests.

7. A method of prioritizing data operation requests, comprising:

initializing a plurality of interface circuits to a first priority value, the plurality of interface circuits coupled between a plurality of semantic processing units and a memory;

allocating an interface circuit from the plurality of interface circuits to a semantic processing unit associated with a data operation request;

selecting a first interface circuit allocated responsive to the data operation request from the semantic processing unit; and selecting a next interface circuit having another data operation request from another semantic processing unit based on the priority value assigned to the interface circuit and a length of time the data operation request has been pending.

8. The method of claim 7, wherein the first interface circuit having a data operation request is selected arbitrarily.

9. The method of claim 7, further comprising:
setting the priority value of the interface circuit to a second priority value after the interface circuit is selected.

10. The method of claim 7, wherein selecting the next interface circuit having a data operation request comprises:
selecting the next interface circuit from the plurality of interface circuits not yet selected; and
selecting the next interface circuit from the plurality of interface circuits previously selected.

11. The method of claim 10, wherein selecting the next interface circuit having a data operation request comprises:
determining the lengths of time the data operation requests in the interface circuits have been pending; for interface circuits having the same priority values; and
selecting the interface circuit having a data operation request pending for a longer time.

12. The method of claim 7 where each semantic processing unit capable of allocating each of the interface circuits with data operation requests.

13. The method of claim 7 includes
receiving, by at least one of the plurality of interface circuits, data operation requests from at least one semantic processing unit; and
selecting the allocated circuit for accessing the memory to process the data operation request.

14. A system comprising:
a direct execution parser configured to control the processing of digital data by semantically parsing data in a buffer;
a semantic processing unit configured to perform data operations when prompted by the direct execution parser; and
a memory subsystem configured to process the digital data when directed by the semantic processing unit, the memory subsystem comprising a plurality of memory caches coupled between the semantic processing unit and a memory, wherein one of the plurality of memory caches comprises a search engine for performing lookup operations when directed by the semantic processing unit, and wherein the search engine for performing lookup operations comprises:
a plurality of interface circuits for receiving lookup requests from a semantic processing unit;
a buffer having one or more entries utilized when allocating an interface circuit from the plurality of interface circuits to a semantic processing unit having a lookup request;
a selection circuit coupled between the plurality of interface circuits and a content-addressable memory, the selection circuit selecting an allocated circuit for accessing the content-addressable memory to process the data operation request.

15. The system of claim 14, wherein the selection circuit performs the selection of the allocated interface circuits in a round-robin fashion.

16. The device of claim 14, wherein each of the plurality of interface circuits is assigned a priority value corresponding to when each interface circuit was selected for processing the data operation request, and wherein the selection circuit performs the selection of the allocated interface circuits based on the assigned priority values.

17. The system of claim 14 wherein the buffer receives the data to be parsed by the direct execution parser from an external network.

18. The system of claim 14 wherein the buffer receives the data to be parsed by the direct execution parser from the semantic processing unit.

* * * * *